(12) United States Patent
Woo et al.

(10) Patent No.: US 8,374,178 B2
(45) Date of Patent: Feb. 12, 2013

(54) APPARATUS AND METHOD FOR SUPPORTING NAT TRAVERSAL IN VOICE OVER INTERNET PROTOCOL SYSTEM

(75) Inventors: Si-Nam Woo, Hwaseong-si (KR); Hyun-A Kim, Suwon-si (KR); Pyung-Bin Lim, Suwon-si (KR); Sang-Il Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 12/627,388

(22) Filed: Nov. 30, 2009

(65) Prior Publication Data
US 2010/0135292 A1 Jun. 3, 2010

(30) Foreign Application Priority Data
Nov. 28, 2008 (KR) ........................ 10-2008-0119346

(51) Int. Cl.
*H04L 12/28* (2006.01)
(52) U.S. Cl. .......................... 370/389; 370/392; 370/465
(58) Field of Classification Search .................... None
See application file for complete search history.

(56) References Cited

U.S. PATENT DOCUMENTS

| | | | | |
|---|---|---|---|---|
| 7,333,500 B2* | 2/2008 | Roshko | ........................ | 370/401 |
| 7,411,917 B1* | 8/2008 | Hardie et al. | ................. | 370/252 |
| 7,480,305 B1* | 1/2009 | Somasundaram | ........... | 370/401 |
| 7,653,745 B1* | 1/2010 | Biswas et al. | ................. | 709/245 |
| 7,684,397 B2* | 3/2010 | Kim et al. | ..................... | 370/389 |
| 7,710,978 B2* | 5/2010 | Signaoff et al. | ............ | 370/395.5 |
| 7,761,597 B2* | 7/2010 | Takeda et al. | ................. | 709/245 |
| 7,787,459 B2* | 8/2010 | Yuan et al. | ..................... | 370/392 |
| 7,933,273 B2* | 4/2011 | Takeda et al. | ................. | 370/400 |
| 8,059,641 B1* | 11/2011 | Rai | ............................... | 370/389 |
| 8,224,985 B2* | 7/2012 | Takeda | .......................... | 709/237 |
| 2006/0274741 A1* | 12/2006 | Wing et al. | ..................... | 370/389 |
| 2007/0076729 A1* | 4/2007 | Takeda | .......................... | 370/401 |
| 2007/0189311 A1* | 8/2007 | Kim et al. | ..................... | 370/401 |
| 2007/0217407 A1* | 9/2007 | Yuan et al. | ..................... | 370/389 |
| 2007/0253418 A1* | 11/2007 | Shiri et al. | ..................... | 370/392 |
| 2008/0062978 A1* | 3/2008 | Hwang et al. | ................. | 370/389 |
| 2008/0080532 A1* | 4/2008 | O'Sullivan et al. | ........... | 370/401 |
| 2008/0151875 A1* | 6/2008 | Lim | ............................... | 370/352 |
| 2010/0040057 A1* | 2/2010 | Ko | ................................ | 370/392 |

* cited by examiner

*Primary Examiner* — Michael J Moore, Jr.
(74) *Attorney, Agent, or Firm* — Jefferson IP Law, LLP

(57) ABSTRACT

An apparatus and a method for operating an exchange in order to support Network Address Translation (NAT) traversal in a Voice over Internet Protocol (VoIP) system are provided. In the method, when a setup request signal is received from a calling Internet phone, first mapping of an IP address and a User Datagram Protocol (UDP) port of the calling Internet phone to first embedded Media Proxy Solution (eMPS) IP address and UDP port is performed. A setup request of the calling Internet phone including the first eMPS IP address and UDP port information is relayed to a called Internet phone. A response signal including an IP address and an UDP port of the called Internet phone is received from the called Internet phone in response to the setup request. Second mapping of the IP address and UDP port of the called Internet phone to second eMPS address and UDP port is performed. A response signal including the second eMPS IP address and UDP port information is relayed to the calling Internet phone in response to the setup request.

20 Claims, 18 Drawing Sheets

APPARATUS AND METHOD FOR SUPPORTING NAT TRAVERSAL IN VOICE OVER INTERNET PROTOCOL SYSTEM

PRIORITY

This application claims the benefit under 35 U.S.C. §119 (a) of a Korean patent application filed in the Korean Intellectual Property Office on Nov. 28, 2008 and assigned Serial No. 10-2008-0119346, the entire disclosure of which is hereby incorporated by reference.

BACKGROUND OF THE INVENTION

1. Field of the Invention

The present invention relates to a Voice over Internet Protocol (VoIP). More particularly, the present invention relates to an apparatus and a method for supporting Network Address Translation (NAT) traversal in a VoIP system.

2. Description of the Related Art

As Internet environments develop and various VoIP services are extended, the VoIP market is markedly expanding. Accordingly, the development of related technology and various research projects are in progress. In addition, as the VoIP market expands, a VoIP phone (also called an Internet phone or an IP phone) is being widely distributed.

Since the number of IP addresses available at the Internet is limited, a plurality of users share one IP address. For example, an Internet router generally used in a household allows a plurality of hosts to use the Internet by executing an NAT function of assigning private IP addresses to a plurality of hosts (e.g., a computer, a notebook, etc.) located at a lower end (Local Area Network (LAN) interface), and mapping the assigned IP addresses to a single public IP address given by a service provider to a user.

When an Internet phone is installed and used in various network environments, more particularly, in an NAT environment, an NAT traversal for an Internet phone is an essential factor because NAT has limitations. The NAT traversal allows communication with a terminal located in an NAT environment using a public IP address given in an Internet environment. The NAT traversal provides an NAT traversal solution for a VoIP signal and a media in a VoIP environment. The conventional method approaches the solution through system establishment on a network and providing a function to a VoIP phone. Representative examples include Simple Traversal of User Datagram Protocol (UDP) through NAT (STUN), Session Border Controller (SBC), etc.

The STUN is a protocol that can detect a type of NAT such as Symmetric NAT, Cone NAT, etc., and port mapping information. A client inside a private network requests connection from an STUN server before starting a session, and is assigned an IP address and a port number to be used by the client, and then uses the IP address and the port number during a session and media traffic transmission. However, STUN does not operate in Symmetric NAT, and an address obtained through the STUN is not useful for all peers and may not operate depending on a network state. That is, the STUN is a technique for allowing an end-terminal to search for existence and a type of NAT, and is a protocol formed based on a client-server model.

The SBC for providing an Internet multimedia service in a packet network is a network system for managing and processing a signal or a media message. In addition, the SBC is primarily used in a large-scale network environment for providing a VoIP service between service providers.

However, in the case where the STUN is applied to the VoIP service environment, there is a limitation that STUN client engines should be installed in all Internet phones and cooperate with an STUN server.

The SBC is a large-capacity system and is designed to provide cooperation between network providers in a VoIP service environment. Accordingly, it is limited in its application to small and medium-sized sites, especially regarding its costs. In addition, when a problem is generated from the SBC, since the problem may have an influence on all calls, it is difficult to guarantee stability of a VoIP service. Since both VoIP Private Branch eXchange (PBX) and SBC should be extended with respect to extension of a VoIP signal, there is a limitation of having dependency in supporting a protocol of SBC. That is, the SBC is a technique widely used between network providers or for a large-capacity site, and so is not suitable for an environment that uses a small and medium-sized VoIP PBX.

As described above, the conventional NAT traversal techniques have difficulties of having to add an Internet phone function and which increases the price of equipment in a network environment.

Therefore, an embedded Media Proxy Solution (eMPS) for providing an NAT traversal with respect to a media stream in a small and medium-sized VoIP PBX system is required.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing an NAT traversal function and processing a media stream in a small and medium-sized VoIP environment.

Another aspect of the present invention is to provide an embedded Media Proxy Solution (eMPS) that can provide an NAT traversal function on a VoIP PBX system.

In accordance with an aspect of the present invention, a method for operating an exchange for supporting Network Address Translation (NAT) traversal in a Voice over Internal Protocol (VoIP) system is provided. The method includes, when receiving a setup request signal from a calling Internet phone, performing first mapping of an IP address and a User Datagram Protocol (UDP) port of the calling Internet phone to first embedded Media Proxy Solution (eMPS) IP address and UDP port, relaying a setup request of the calling Internet phone including the first eMPS IP address and UDP port information to a called Internet phone, receiving a response signal including an IP address and an UDP port of the called Internet phone from the called Internet phone in response to the setup request, performing second mapping of the IP address and UDP port of the called Internet phone to second eMPS address and UDP port, and relaying a response signal including the second eMPS IP address and UDP port information to the calling Internet phone in response to the setup request.

In accordance with another aspect of the present invention, a method for operating an exchange for supporting Network Address Translation (NAT) traversal in a Voice over Internal Protocol (VoIP) system is provided. The method includes receiving media data from a calling Internet phone based on source address and first User Datagram Protocol (UDP) port information, and destination address and second UDP port information, determining the destination address, a destination address corresponding to a second UDP port, a third UDP port, the source address, a source address corresponding to the first UDP port, and a fourth UDP port using a mapping table, and relaying the media data to a called Internet phone based on the destination address, the destination address corresponding to the second UDP port, the third UDP port, the source address, the source address corresponding to the first UDP port, and the fourth UDP port.

In accordance with still another aspect of the present invention, a method for operating an exchange for supporting Network Address Translation (NAT) traversal in a Voice over Internal Protocol (VoIP) system is provided. The method includes receiving a packet from an Internet phone, comparing an IP address of the received packet and a User Datagram Protocol (UDP) port of the received packet with registered information, converting the IP address and the UDP port of the received packet into an IP address and an UDP port for the NAT traversal, and relaying the received packet to a counterpart Internet phone using the converted IP address and UDP port.

In accordance with yet another aspect of the present invention, a system for supporting Network Address Translation (NAT) traversal in a Voice over Internal Protocol (VoIP) system is provided. The system includes a calling Internet phone for transmitting a setup request signal to an exchange to receive IP address and UDP port information for NAT traversal of a called Internet phone, the called Internet phone for transmitting a response signal to the exchange in response to the setup request signal to receive IP address and UDP port information for NAT traversal of the calling Internet phone, the exchange for generating an IP address and an UDP port for NAT traversal of the called Internet phone, for relaying the same to the calling Internet phone, for generating an IP address and an UDP port for NAT traversal of the calling Internet phone, and for relaying the same to the called Internet phone.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

Exemplary embodiments of the present invention provide an apparatus and a method for supporting a Network Address Translation (NAT) traversal in a Voice over Internet Protocol (VoIP) service.

Figure 1:
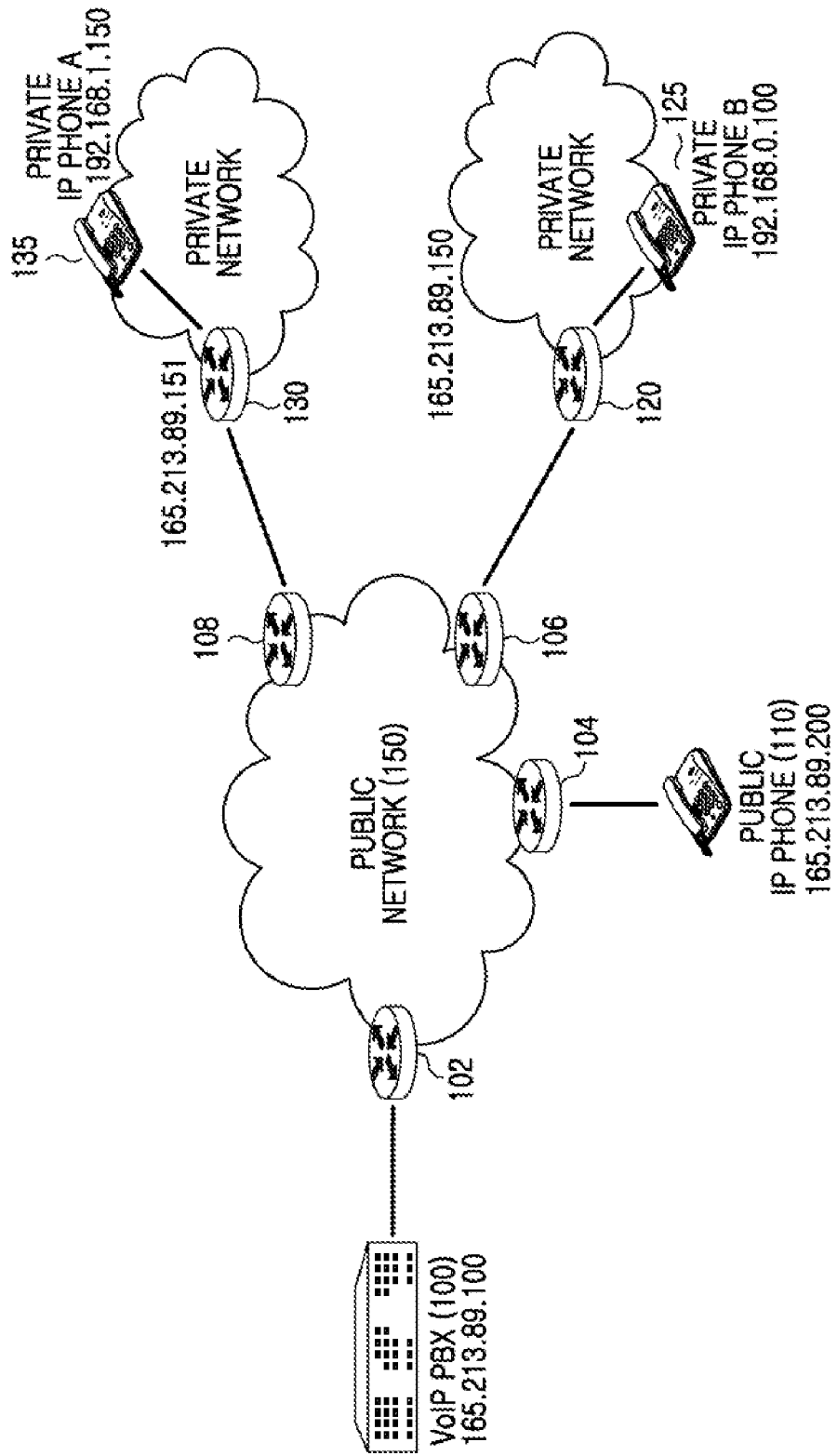
FIG. 1 is a diagram illustrating a network construction for a Voice over Internal Protocol (VoIP) service according to an exemplary embodiment of the present invention.

FIG. 1 is a diagram illustrating a network configuration for a VoIP service according to an exemplary embodiment of the present invention.

Referring to FIG. 1, a VoIP Private Branch eXchange (PBX) 100 and an Internet phone 110 are located in a public network 150, while Internet phone B 125 and Internet phone A 135 are located in separate private networks.

The public network 150 is an area that uses a public IP address. IP addresses that are unique on the Internet network are used on the public network 150. The VoIP PBX 100 uses a public IP address of 165.213.89.100, and the Internet phone 110 uses a public IP address of 165.213.89.200. The public network 150 includes routers 102, 104, 106, and 108. The routers 102, 104, 106, and 108 are apparatuses for connecting Local Area Networks (LANs), designate a path according to a routing table, and transmit a packet.

The private networks are areas that primarily use a private IP address. The private IP address is not recognized on an Internet network, and is usable only in an internal network. For efficient use of a limited IP address, the private network uses a router, such as a router used by a household or a company. In this case, the Internet phone B 125 and the Internet phone A 135 connected to the Internet network via the router use private IP addresses. For example, the Internet phone A 135 uses a private IP address of 192.168.1.150, and the Internet phone B 125 uses a private IP address of 192.168.0.100.

When the Internet phone B 125 and the Internet phone A 135 located in private networks transmit a media packet (e.g., voice and video) to the outside, corresponding IP addresses are converted to public IP addresses via Network Address Translations (NATs) 120 and 130. Therefore, since the converted IP addresses do not collide with other IP addresses outside, the private network may use a number of internal IP addresses that is greater than that allowed by the regulation.

For example, the Internet phone A 135 uses a private IP address of 192.168.1.150 inside the private network. But, when transmitting a media packet to the outside, the private IP address of 192.168.1.150 is converted into a public IP address of 165.213.89.151. Likewise, the Internet phone B 125 uses a private IP address of 192.168.0.100 inside the private network. But, when transmitting a media packet to the outside, the private IP address of 192.168.0.100 is converted into a public IP address of 165.213.89.150.

The Internet phones 110, 125, and 135 perform telephone communication via the Internet network by modulating voice into a data signal. A voice telephone that uses the Internet network without discrimination of a private Internet network and a public Internet network, or transmits a packet using a packet exchange method is called an Internet phone. The Internet phones 110, 125, and 135 may be separate, dedicated Internet phones or Internet phones connected to a computer.

Since the Internet phone 110 uses a public IP address, the Internet phone 110 transmits media data externally using a self public IP address of 165.213.89.200. However, since the private IP addresses of the Internet phone B 125 and the Internet phone A 135 may not be recognized on the outside, a separate apparatus for mapping these addresses is required.

For this purpose, the VoIP PBX 100 provides an embedded Media Proxy Solution (eMPS) that provides an NAT traversal function and processes a media stream in a small and medium-sized VoIP service environment. That is, the VoIP PBX 100 relays a media packet of a calling Internet phone to a called Internet phone, or relays a media packet of a called Internet phone to a calling Internet phone using a media management table.

In addition, according to an exemplary embodiment of the present invention, the VoIP PBX 100 can guarantee compatibility with a VoIP signal during a media stream process. In addition, the VoIP PBX 100 can process a VoIP signal and a media via one Ethernet interface using IP forwarding, and support Quality of Service (QoS) when transmitting media. The VoIP PBX 100 can process an abnormal call using traffic information, and prevent an external attack from entering a system using a dynamic port assignment method. Lastly, the VoIP PBX 100 can provide an end-user hiding function through a signal and a media relay scheme.

The VoIP PBX 100 may be located in a private address domain, and is applicable to the public network 150 by applying a static NAT to a signal port and a media port in order to support a VoIP service.

Figure 2A:
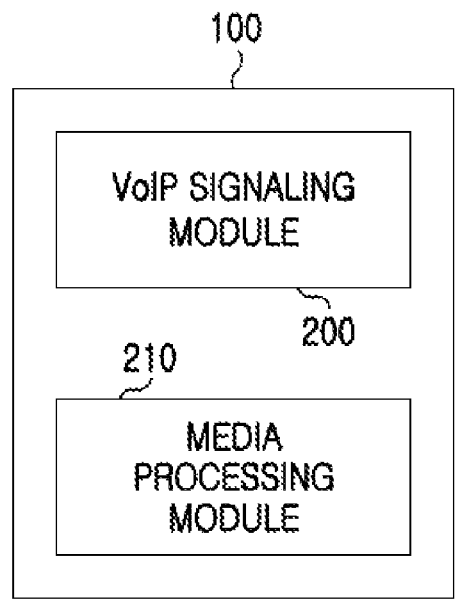
FIGS. 2A and 2B are block diagrams illustrating a VoIP Private Branch eXchange (PBX) including an embedded Media Proxy Solution (eMPS) according to an exemplary embodiment of the present invention.
Figure 2B:
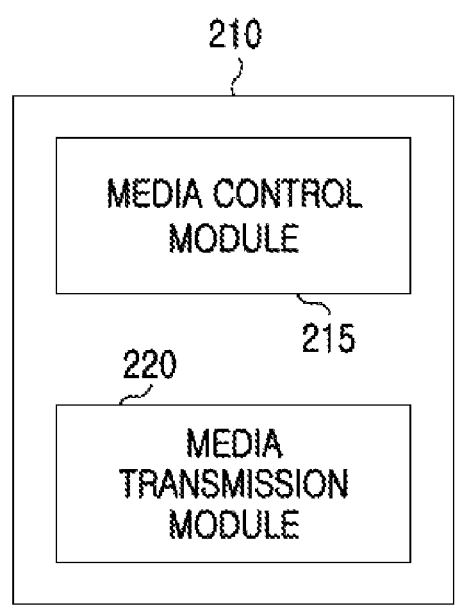

FIGS. 2A and 2B are block diagrams illustrating a VoIP PBX including an eMPS according to an exemplary embodiment of the present invention.

Referring to FIG. 2A, a VoIP PBX 100 is divided into a VoIP signaling module 200 and a media processing module 210. The VoIP signaling module 200 processes a VoIP signal message. The VoIP signaling module 200 processes a registration message and a call process message of a VoIP phone, and requests the media processing module 210 to process a media message, that is, voice and/or video packet with respect to a generated call. In addition, the VoIP signaling module 200 determines a public IP address of an Internet phone via a registration message in an NAT environment. The media processing module 210 provides a relay function for a media message using a media management table of eMPS, and also provides an NAT traversal function.

Referring to FIG. 2B, an eMPS structure of the media processing module 210 includes a media control module 215 for managing and maintaining process information for a media and for dynamically assigning a User Datagram Protocol (UDP), and a media transmission module 220 for providing a function of relaying media data between VoIP phones and an NAT traversal function. In addition, the media processing module 210 applies QoS and manages a traffic state using the modules.

A media management table of eMPS for management and process of a media stream is illustrated in Table 1. The media processing module 210 processes a media stream using media mapping information of a caller and a callee of the media management table of eMPS.

TABLE 1

| Index | Inbound Source | | Inbound Destination | | Outbound Source | | Outbound Destination | | Etc | |
|---|---|---|---|---|---|---|---|---|---|---|
| | IP Address | UDP Port | IP Address | UDP Port | IP Address | UDP Port | IP Address | UDP Port | QoS | Traffic Statistics |
| 1 | 165.213.89.200 | 9000 | 165.213.89.100 | 40000 | 165.213.89.150 | 9000 | 165.213.89.100 | 40002 | 000100 | 1000/1000 |
| 2 | 165.213.89.150 | 9000 | 165.213.89.100 | 40004 | 165.213.89.151 | 9000 | 165.213.89.100 | 40006 | 000100 | 5000/5000 |
| — | — | — | — | — | — | — | — | — | — | — |

Table 1 is divided into inbound information and outbound information. The inbound information is information of a caller, and the outbound information is information of a callee. The Inbound/outbound destinations are address information dynamically assigned to eMPS, the inbound source is address information of a caller, and the outbound source is address information of a callee. The media processing module 210 performs admission control of a received media packet with reference to this information. In addition, when registered information and a received port of an Internet phone are different from each other, the media processing module 210 determines that the Internet phone is located in a private network, and may provide a fast NAT traversal by performing a port redirection.

Lastly, the eMPS management table includes a traffic state and QoS information. Using this information, the media processing module 210 can control QoS and traffic of each media stream. In addition, a media stream includes a Real-time Transport Protocol (RTP) and an RTP Control Protocol (RTCP). The RTCP is processed in the same procedure as the RTP based on RTP process information.

Figure 3:
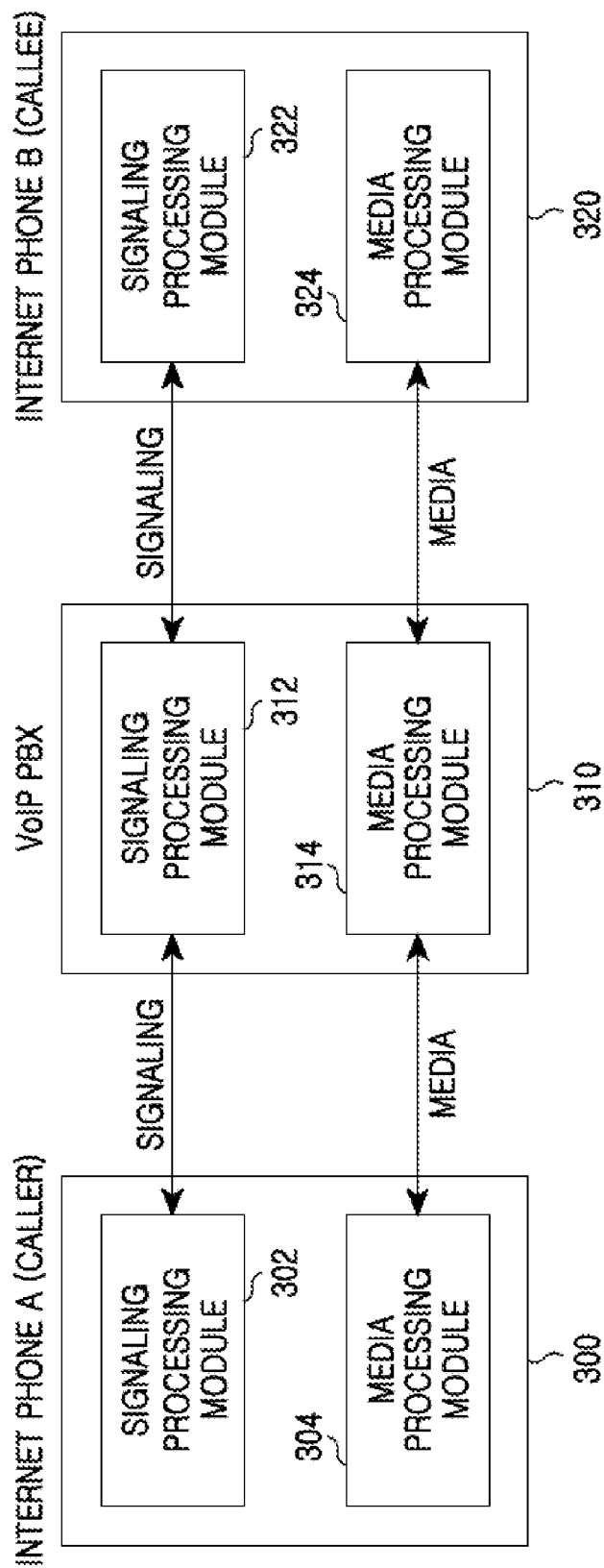
FIG. 3 is a block diagram illustrating a signal and a media message flow between an Internet phone and a VoIP PBX according to an exemplary embodiment of the present invention.

FIG. 3 is a block diagram illustrating a signal and a media message flow between an Internet phone and a VoIP PBX according to an exemplary embodiment of the present invention.

Referring to FIG. 3, Internet phones 300 and 320 include signaling processing modules 302 and 322, and media processing modules 304 and 324. A VoIP signal and media are relayed and transferred via a signaling processing module 312 and a media processing module 314 of a VoIP PBX 310. In other words, the VoIP PBX 310 serves as a signal gateway for processing a VoIP signal, and serves as a media proxy for processing media.

Figure 4:
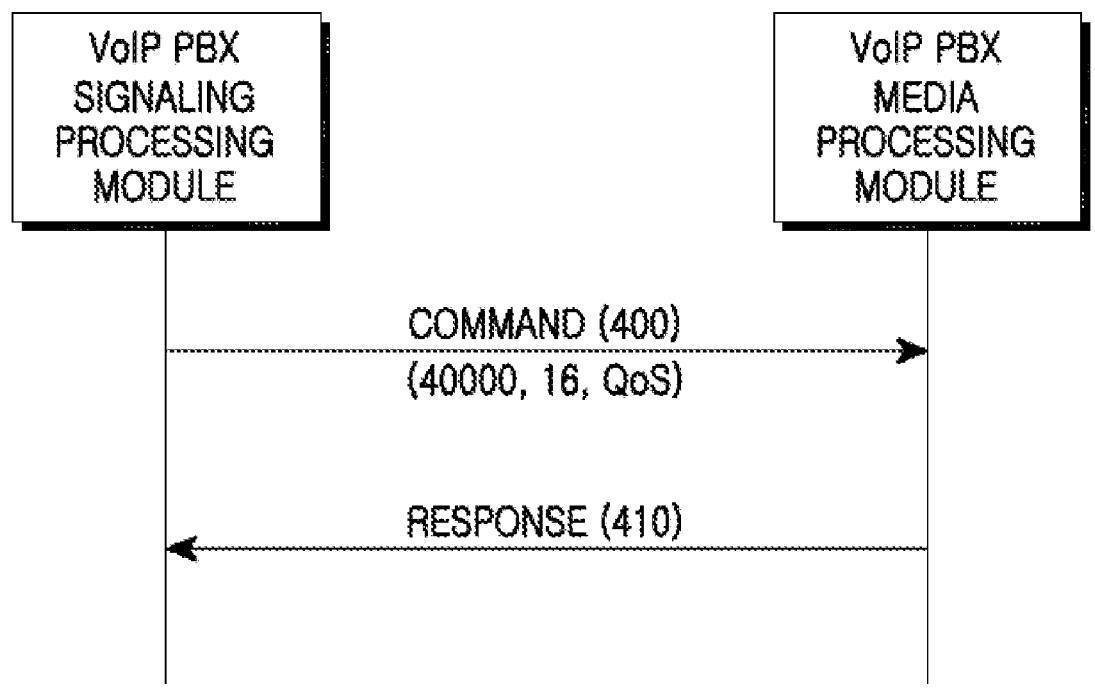
FIG. 4 is a diagram illustrating a message flow for setting a Media Proxy Solution (MPS) at a VoIP PBX according to an exemplary embodiment of the present invention.

FIG. 4 is a diagram illustrating a message flow for setting MPS at a VoIP PBX according to an exemplary embodiment of the present invention.

Referring to FIG. 4, a signaling processing module of the VoIP PBX transmits a command message to a media processing module in step 400. The media processing module initializes eMPS information and transmits a response message to the signaling processing module in step 410. The command message includes UDP port information, the number of UDP ports, and a QoS value required for setting the eMPS. The eMPS setting is extensible. For example, a UDP port is set to 40000 and the number of UDP ports is set to 16 in FIG. 4.

Figure 5:
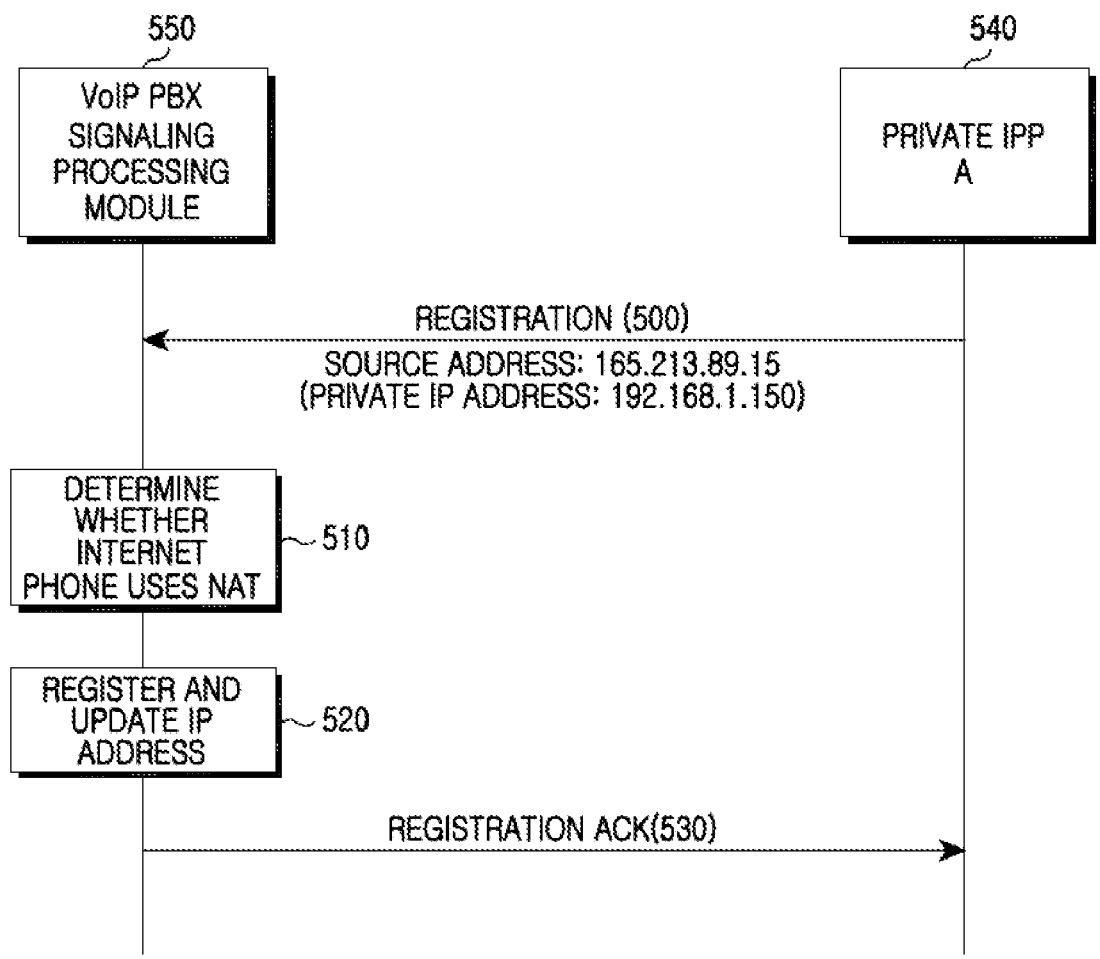
FIG. 5 is a diagram illustrating a message flow for registration according to an exemplary embodiment of the present invention.

FIG. 5 is a diagram illustrating a message flow for registration according to an exemplary embodiment of the present invention.

Referring to FIG. 5, an Internet phone A 540 connected to a private network periodically transmits a registration message including a private IP address to a signaling processing module of a VoIP PBX 550 in step 500. The Internet phone registers its use in the VoIP PBX using the registration message, and can use a VoIP service. Here, a defined registration message can be mapped to a standardized message used in a VoIP signal protocol.

The VoIP PBX 550 determines whether the Internet phone A 540 uses an NAT function based on a received registration message in step 510. That is, the VoIP PBX 550 determines whether the Internet phone A 540 is located in a public network or a private network. The VoIP PBX 550 can determine this information by comparing an IP address (165.213.89.151) of a packet included in the registration message with an address (192.168.1.150) of the Internet phone.

The VoIP PBX 550 updates the address and the state of the Internet phone A 540 in step 520. The registration procedure operates periodically so that information of the Internet phone A 540 can be updated after a predetermined time period.

The VoIP PBX 550 updates the IP address and state of the Internet phone A 540 and transmits an ACKnowledge (ACK) message to the Internet phone A 540 in step 530.

Figure 6:
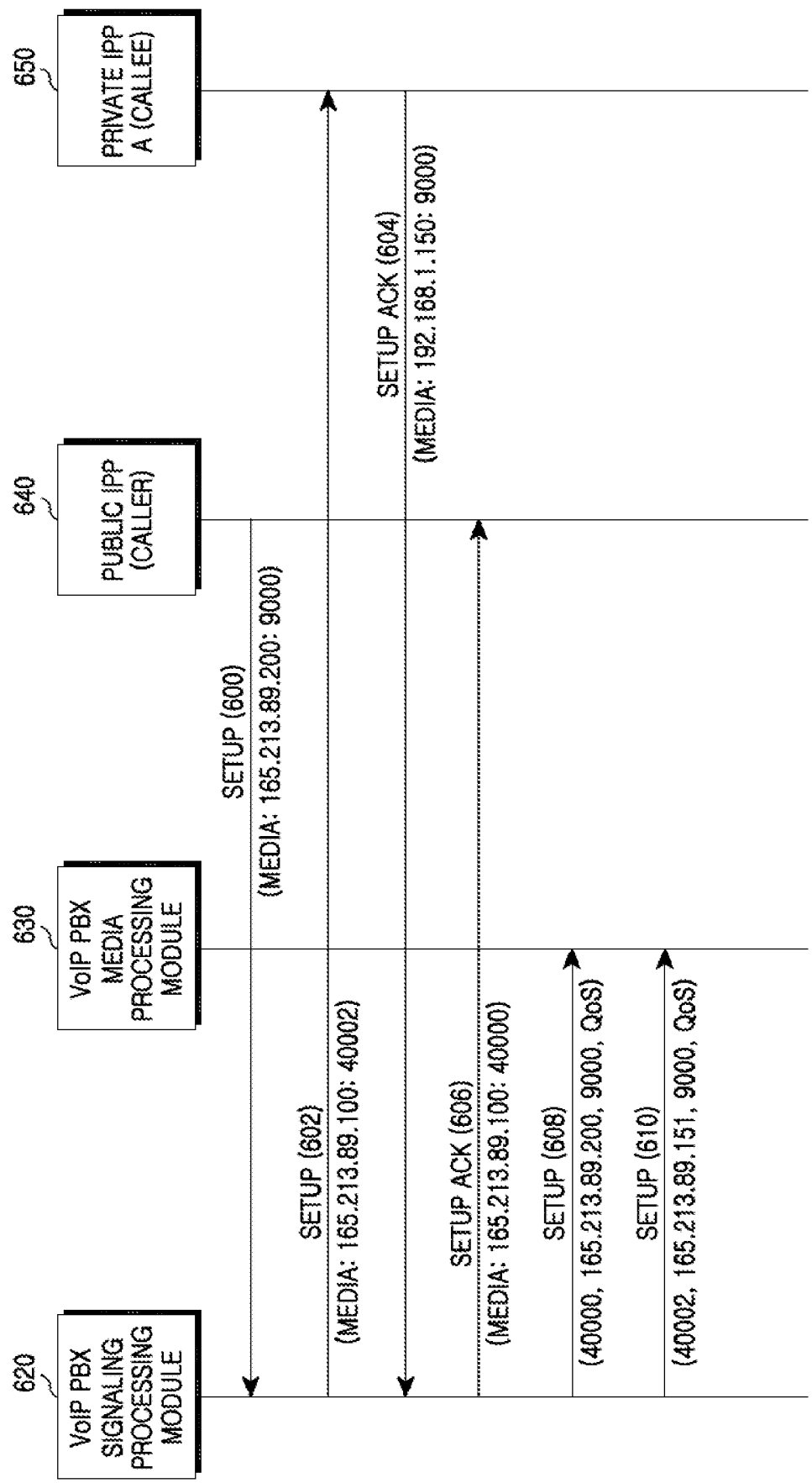
FIG. 6 is a diagram illustrating a VoIP call processing procedure according to an exemplary embodiment of the present invention.

FIG. 6 is a diagram illustrating a VoIP call processing procedure according to an exemplary embodiment of the present invention.

Referring to FIG. 6, the procedure assumes a call process between a calling Internet phone 640 located in a public network, and a called Internet phone 650 (called an Internet phone A) located in a private network. In FIG. 6, a VoIP signal generally expresses a call connection process. The above procedure can be expressed using a Session Initiation Protocol (SIP), H.323, or a user-defined protocol.

In an exemplary implementation, a setup message which attempts a call connection, and a SetupAck message transmitted when an Internet phone that has received the setup message responds are defined.

First, for transmission/reception of media, the Internet phone 640 transmits a setup message including an address/port (165.213.89.200:9000) of the Internet phone 640 to a signaling processing module of a VoIP PBX 620 in step 600. The signaling processing module of the VoIP PBX 620 determines a called number and then transmits a setup message to the called Internet phone A 650 in step 602. At this point, the setup message includes address/port (165.213.89.100:40002) information. The port (40002) is dynamically assigned and serves as a port for an outbound address of the Internet phone 640.

The Internet phone A 650 transmits a SetupAck message including its address and port information (192.168.1.150:9000) and informing of a communication connection state to the signaling processing module of the VoIP PBX 620 when communication is connected in step 604. At this point, since the Internet phone A 650 cannot recognize a public IP address (165.213.89.151) and port information bound to a private IP address and a port (192.168.1.150) in an NAT environment, the Internet phone A 650 transmits a SetupAck message including the private IP address and the port to an NAT. The NAT recognizes a public address of the Internet phone A 650 through the process of FIG. 5 of the VoIP PBX 620, and transfers the public IP address (165.213.89.151), not the private IP address (192.168.1.150), to the media processing module of the VoIP PBX 630 using this information.

The signaling processing module of the VoIP PBX 620 transmits a SetupAck message including address and port information (165.213.89.100:40000) of a different eMPS and informing of a communication connection state to the Internet phone 640 in step 606. The port (40000) is dynamically assigned and serves as a port for an inbound address of the Internet phone 640.

A call connection procedure is performed through the above-described process. After media session information for inbound/outbound traffic is determined, an eMPS port assignment process is performed.

That is, the signaling processing module of the VoIP PBX 620 transmits a calling SETUP message including UDP port information (40000) of eMPS, destination address/port information (165.213.89.200:9000) of a media stream, and QoS information to the media processing module of the VoIP PBX 630 in step 608.

The signaling processing module of the VoIP PBX 620 transmits a called SETUP message including UDP port information (40002) of eMPS, destination address/port information (165.213.89.151:9000) of a media stream, and QoS information to the media processing module of the VoIP PBX 630 in step 610. The signaling processing module of the VoIP PBX 620 determines whether the destination address of the media stream exists in NAT via a registration process. When the destination address of the media stream exists in the NAT environment, the signaling processing module of the VoIP PBX 620 changes the destination address of the media stream into a public address (165.213.89.151), not the private address (192.168.1.150) of the Internet phone, and transmits a called SETUP message.

As described above, UDP port assignment of eMPS is performed via respective SETUP messages for processing an inbound address and an outbound address, and the UDP port is dynamically assigned based on information included in the SETUP messages. In addition, the SETUP message includes a value for a QoS process, so that an individual QoS function may be added. Packets other than packets of an assigned port are dropped, so that a packet filtering function can be performed. In addition, a media stream of an Internet phone is relayed, so that a packet transmission/reception state of the Internet phone can be determined, and a call processing function can be performed using this state information.

A media management table of eMPS via a call processing procedure of FIG. 6 is illustrated in Table 2 below.

VoIP PBX 720 in order to release a call in step 700. The signaling processing module of the VoIP PBX 720 transmits a call disconnect message to the Internet phone A 750 in step 705. According to an exemplary embodiment of the present invention, a disconnect message is a message for informing of call termination and can be mapped to a VoIP signal protocol.

After call termination, the signaling processing module of the VoIP PBX 720 transmits a calling release message to the media processing module of the VoIP PBX 730 in order to release a UDP port of eMPS using UDP port information in step 710. In addition, the signaling processing module of the VoIP PBX 720 transmits a called release message to the media processing module of the VoIP PBX 730 in step 715.

Figure 8:
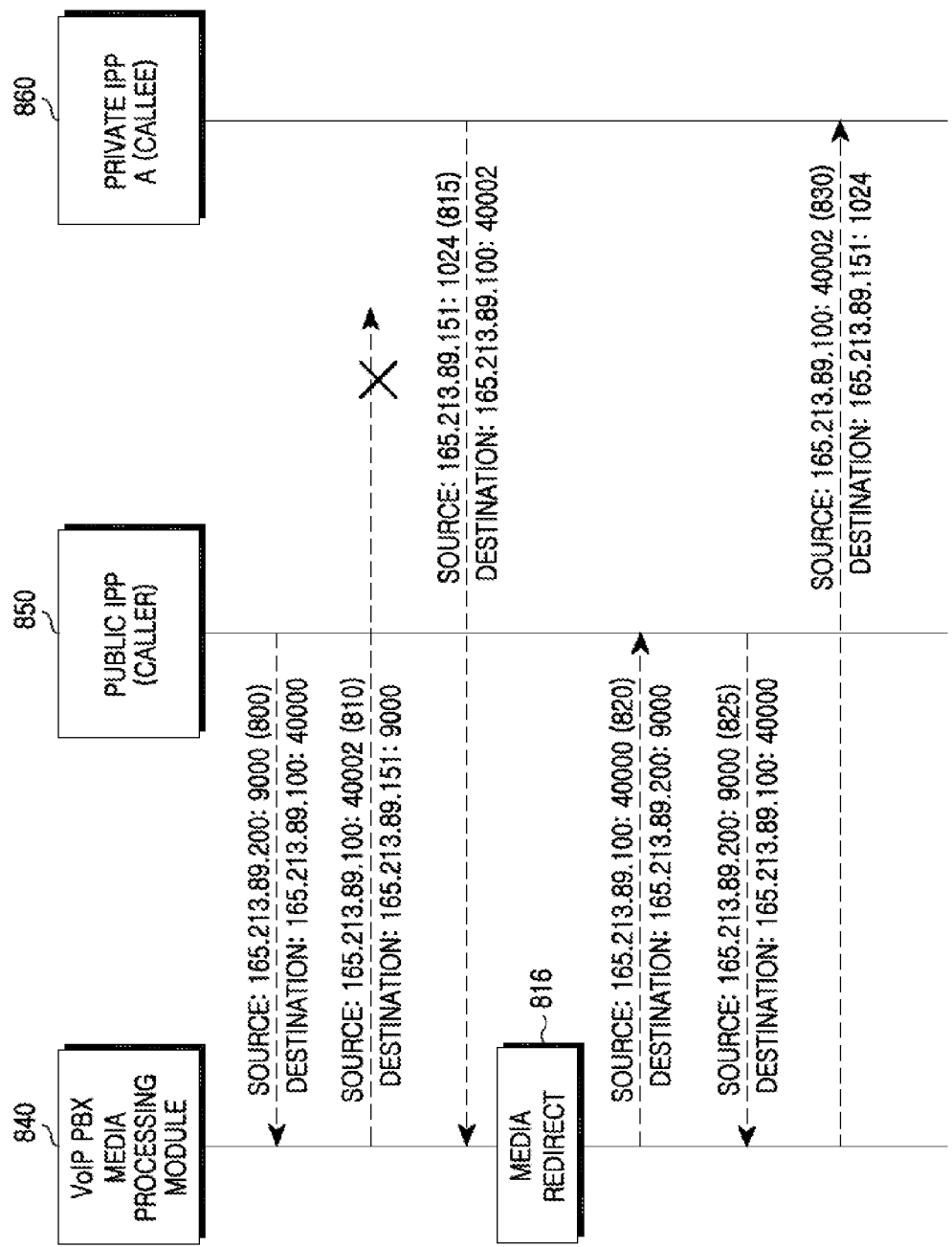
FIG. 8 is a diagram illustrating a VoIP call processing procedure according to an exemplary embodiment of the present invention.

FIG. 8 is a diagram illustrating a media processing procedure for a VoIP call according to an exemplary embodiment of the present invention.

Referring to FIG. 8, it is assumed that a call is connected between the Internet phone 850 and the Internet phone A 860 through the call processing procedure of FIG. 6.

After the VoIP call connection procedure of FIG. 6 is completed, the Internet phone 850 transmits a media stream to the media processing module of the VoIP PBX 840 in step 800. That is, the Internet phone 850 transmits a packet whose destination address is 165.213.89.100 and whose destination port is 4000. This is because an address/port of the Internet phone 850 has been mapped from 165.213.89.200, 90000 to an address/port of eMPS (165.213.89.100, 40000) during the VoIP call connection procedure of FIG. 6.

The media processing module of the VoIP PBX 840 relays a media stream of the Internet phone 850 to the Internet phone A 860 using a media management table (refer to Table 2) in step 810. A source address of the relay packet uses a port of eMPS assigned to the Internet phone A 860 as a source port (40002), and a destination address/port is changed into an address/port (165.213.89.151: 9000) of the Internet phone A 860. However, when a public port of the Internet phone A 860 in an NAT is 1024, a packet for an UDP port (9000) cannot be processed.

The media processing module of the VoIP PBX 840 receives a media stream whose source address and port are 165.213.89.151, 1024, and whose destination address and port are 165.213.89.100, 40002 from the Internet phone A 860 in step 815. The source address is a scheme of changed information (165.213.89.151:1024) after passing NAT. In an actual NAT internal environment, the Internet phone A 860 transmits media using a source address as a local address (192.168.1.150:9000).

The media processing module of the VoIP PBX 840 performs media redirection in step 816. That is, the media pro-

TABLE 2

| Index | Inbound Source | | Inbound Destination | | Outbound Source | | Outbound Destination | | Etc | |
|---|---|---|---|---|---|---|---|---|---|---|
| | IP Address | UDP Port | IP Address | UDP Port | IP Address | UDP Port | IP Address | UDP Port | QoS | Traffic Statistics |
| 1 | 165.213.89.200 | 9000 | 165.213.89.100 | 40000 | 165.213.89.151 | 9000 | 165.213.89.100 | 40002 | 000100 | 1000/1000 |

Figure 7:
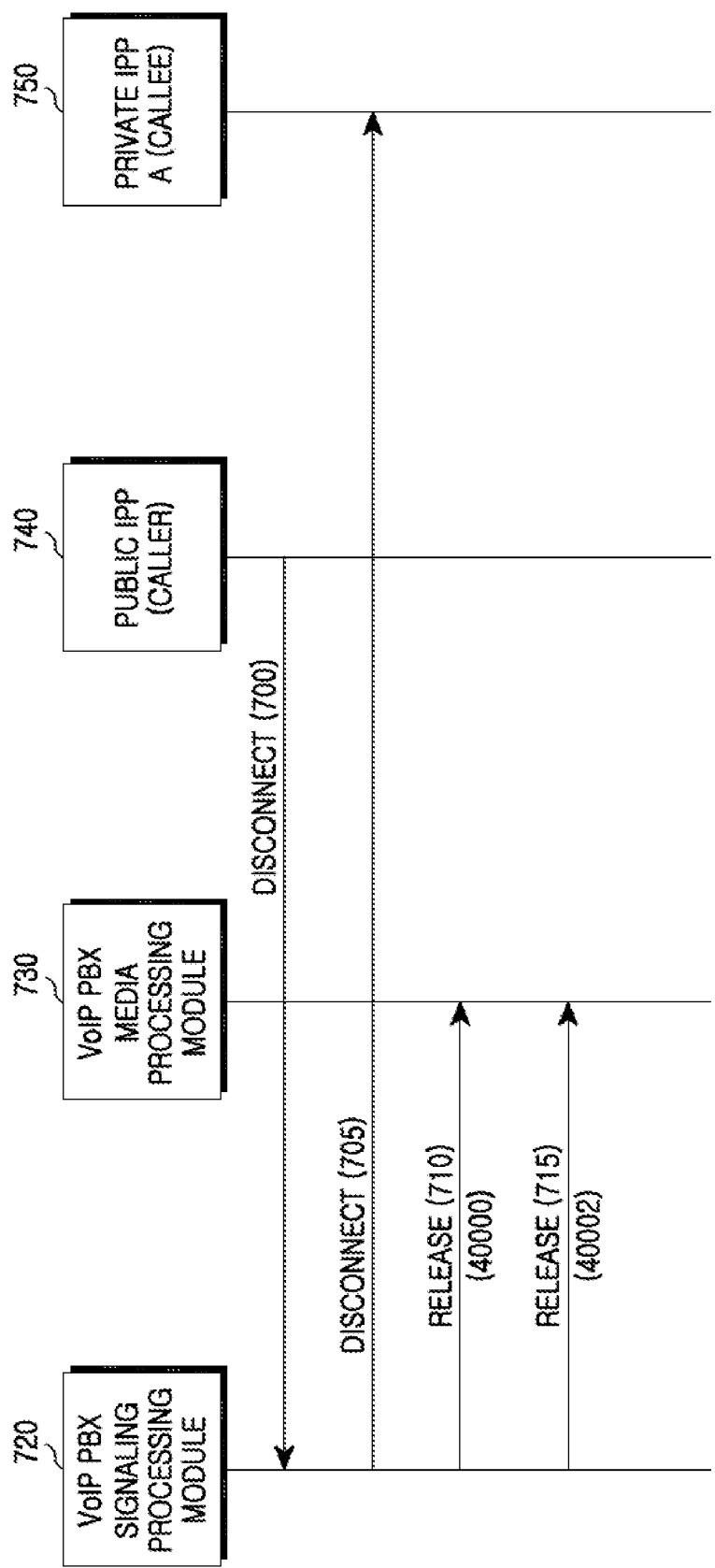
FIG. 7 is a diagram illustrating message flow for a VoIP call release procedure according to an exemplary embodiment of the present invention.

FIG. 7 is a diagram illustrating a message flow for a VoIP call release procedure according to an exemplary embodiment of the present invention. In FIG. 7, it is assumed that a call is connected between an Internet phone 740 and an Internet phone A 750 through the call processing procedure of FIG. 6.

Referring to FIG. 7, an Internet phone 740 transmits a call disconnect message to the signaling processing module of the cessing module updates a media management table of MPS by changing a port of the Internet phone A 860 from 9000 to 1024 through reception of a media stream from the Internet phone A 860.

In other words, a change of a port and whether an NAT environment exists in step 815 are determined by comparing registration information with port information of received media in the case where the media stream of the Internet phone A 860 is transferred to the VoIP PBX 840. At this point, the media management table of eMPS is changed using the received media port.

The media processing module of the VoIP PBX 840 relays media data received from the Internet phone A 860 to the Internet phone 850 in step 820.

The Internet phone 850 transmits a media stream to the media processing module of the VoIP PBX 840 in step 825.

The media processing module of the VoIP PBX 840 relays a media stream of the Internet phone 850 to the Internet phone A 860 using the changed media management table of eMPS (refer to Table 2) in step 830.

Figure 9:
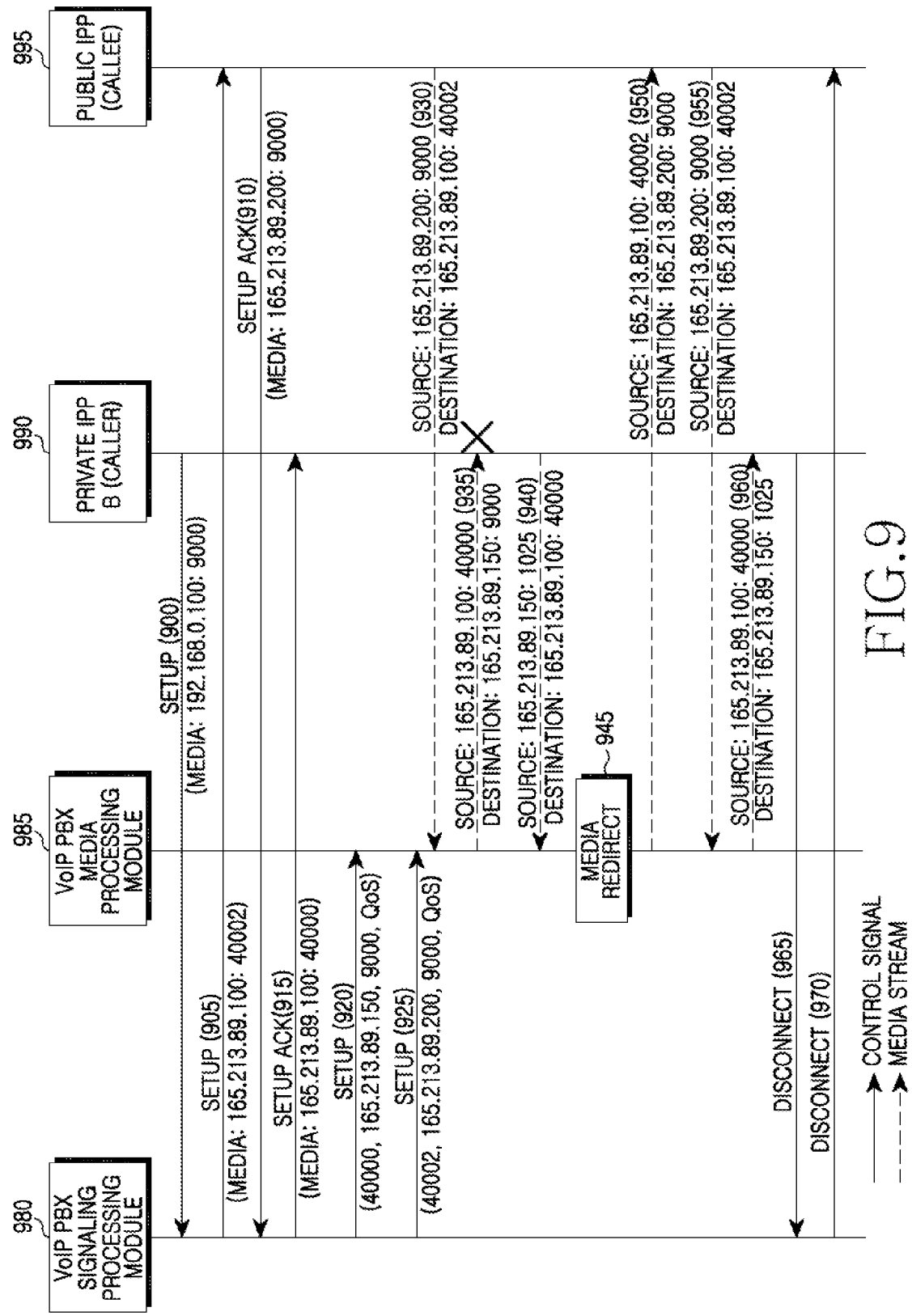
FIG. 9 is a diagram illustrating a VoIP call processing procedure according to an exemplary embodiment of the present invention.

FIG. 9 is a diagram illustrating a VoIP call processing procedure according to an exemplary embodiment of the present invention.

Referring to FIG. 9, the procedure assumes a call process between a calling Internet phone 990 (called an Internet phone B) in a private network and a called Internet phone 995 in a public network.

First, the Internet phone B 990 transmits a setup message whose address is 192.168.0.100 and whose port is 9000 to the signaling processing module of the VoIP PBX 100 via NAT 980 in step 900.

The signaling processing module of the VoIP PBX 980 determines a called number and then transmits a setup message to the called Internet phone 995 in step 905. At this point, the setup message includes address/port information (165.213.89.100: 40002) of eMPS.

When communication is connected, the Internet phone 995 transmits a SetupAck message including its address and port information (165.213.89.200: 9000) and informing a communication connection state to the signaling processing module of the VoIP PBX 980 in step 910.

The signaling processing module of the VoIP PBX 980 transmits a SetupAck message informing a communication connection state and including different address and port information (165.213.89.100: 40000) of eMPS to the Internet phone B 990 in step 915. A call connection procedure is performed through the above-described process. After media session information for inbound/outbound is determined, an eMPS port assignment procedure is performed.

That is, the signaling processing module of the VoIP PBX 980 transmits a calling SETUP message including UDP port information (40000) of eMPS, destination address/port information (165.213.89.150: 9000) of a media stream, and QoS information to the media processing module of the VoIP PBX 985 in step 920.

In addition, the signaling processing module of the VoIP PBX 980 transmits a called SETUP message including UDP port information (40002) of eMPS, destination address/port information (165.213.89.200: 9000) of a media stream, and QoS information to the media processing module of the VoIP PBX 985 in step 925.

A media management table of eMPS through the call processing procedure of FIG. 9 is illustrated in Table 3.

After a call connection procedure is completed, the Internet phone 995 transmits a media stream to the media processing module of the VoIP PBX 985 in step 930. That is, the Internet phone 995 transmits a packet whose destination address is 165.213.89.100 and whose destination port is 40002 because an address/port of the Internet phone 995 has been mapped from 165.213.89.200, 9000 to an address/port (165.213.89.100, 40002) of eMPS.

The media processing module of the VoIP PBX 985 relays a media stream of the Internet phone 995 to the Internet phone B 990 using the media management table of eMPS (refer to Table 3) in step 935. A source address of the relay packet uses a port of eMPS assigned to the Internet phone B 990 as a source port (40000), and the destination address/port is changed to an address/port (165.213.89.150: 9000) of the Internet phone B 990. However, when a public port of the Internet phone B 990 in the NAT environment is 1025, a packet for an UDP port (9000) cannot be processed.

The media processing module of the VoIP PBX 985 receives a media stream whose source address and port are 165.213.89.150, 1025, and whose destination address and port are 165.213.89.100, 40000 from the Internet phone B 990 in step 940.

The media processing module of the VoIP PBX 985 performs media redirection in step 945. That is, the media processing module updates the media management table of eMPS by changing a port of the Internet phone 995 from 9000 to 1025 through reception of a media stream from the Internet phone 995.

The media processing module of the VoIP PBX 985 relays media data received from the Internet phone B 990 to the Internet phone 995 in step 950.

The Internet phone 995 transmits a media stream to the media processing module of the VoIP PBX 985 in step 955.

The media processing module of the VoIP PBX 985 relays a media stream of the Internet phone 995 to the Internet phone B 990 using the changed media management table of eMPS (refer to Table 3) in step 960.

As described above, the Internet phone B 990 serves as a calling phone. When a problem that media data of the Internet phone 995 is not relayed occurs, public port information of the Internet phone B 990 is determined using UDP port information of media data received from the Internet phone B 990, and packets after that are redirected and transmitted using this port information.

The Internet phone B 990 transmits a disconnect message to the signaling processing module of the VoIP PBX 980 in order to disconnect a call in step 965. The signaling processing module of the VoIP PBX 980 transmits a disconnect message to the Internet phone 995 in step 970.

Figure 10:
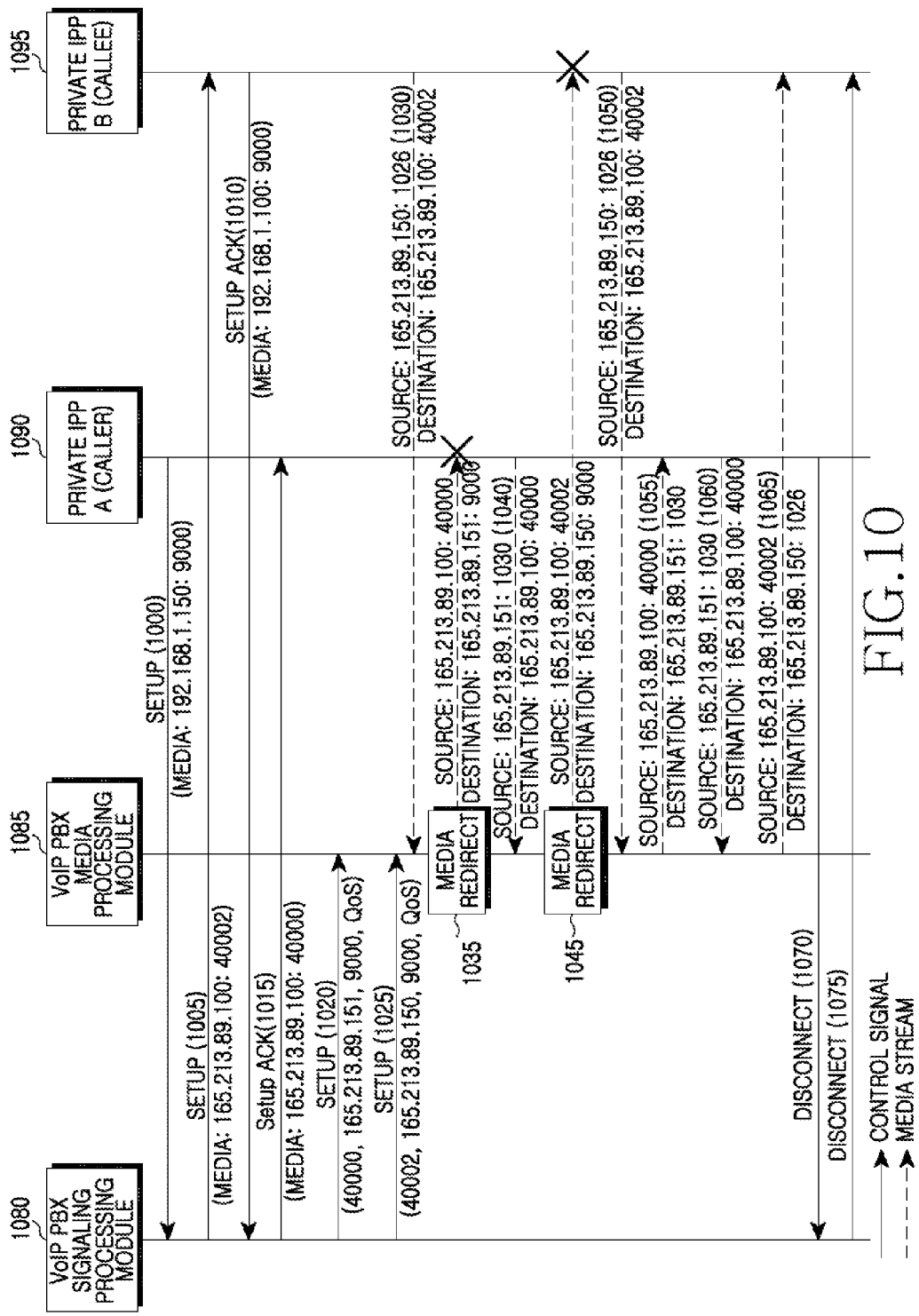
FIG. 10 is a diagram illustrating a VoIP call processing procedure according to an exemplary embodiment of the present invention.

FIG. 10 is a diagram illustrating a VoIP call processing procedure according to an exemplary embodiment of the present invention.

Referring to FIG. 10, the procedure assumes a call process between a calling Internet phone A 1090 (called an Internet

TABLE 3

| | Inbound Source | | Inbound Destination | | Outbound Source | | Outbound Destination | | Etc | |
|---|---|---|---|---|---|---|---|---|---|---|
| Index | IP Address | UDP Port | IP Address | UDP Port | IP Address | UDP Port | IP Address | UDP Port | QoS | Traffic Statistics |
| 1 | 165.213.89.150 | 9000 | 165.213.89.100 | 40000 | 165.213.89.200 | 9000 | 165.213.89.100 | 40002 | 000100 | 1000/1000 | phone A) located in a private network, and a called Internet phone 1095 (called an Internet phone B) located in a private network.

First, the Internet phone A 1090 transmits a setup message whose address is 192.168.1.150 and whose port is 9000 to the signaling processing module of the VoIP PBX 1080 via an NAT in step 1000.

The signaling processing module of the VoIP PBX 1080 determines a called number and then transmits a setup message to the called Internet phone B 1095 in step 1005. At this point, the setup message includes address/port information of eMPS (165.213.89.100:40002).

When communication is connected, the Internet phone B 1095 transmits a SetupAck message including its address and port information (192.168.0.100: 9000) and informing a communication connection state to the signaling processing module of the VoIP PBX 1080 in step 1010.

The signaling processing module of the VoIP PBX 1080 transmits a SetupAck message informing a communication connection state and including different address and port information (165.213.89.100:40000) of eMPS to the Internet phone A 1090 in step 1015. The call connection procedure is performed through the above-described process. After media session information for inbound/outbound is determined, an eMPS port assignment procedure is performed.

That is, the signaling processing module of the VoIP PBX 1080 transmits a calling SETUP message including UDP port information (40000) of eMPS, destination address/port information (165.213.89.151: 9000) of a media stream, and QoS information to the media processing module of the VoIP PBX 1085 in step 1020.

In addition, the signaling processing module of the VoIP PBX 1080 transmits a called SETUP message including UDP port information (40002) of eMPS, destination address/port information (165.213.89.150: 9000) of a media stream, and QoS information to the media processing module of the VoIP PBX 1085 in step 1025.

A media management table of eMPS through the call processing procedure of FIG. 10 is illustrated in Table 4.

ever, when a public port of the Internet phone A 1090 in the NAT environment is 1030, a packet for an UDP port (9000) cannot be processed.

The media processing module of the VoIP PBX 1085 receives a media stream whose source address and port are 165.213.89.151, 1030, and whose destination address and port are 165.213.89.100, 40000 from the Internet phone A 1090 in step 1040.

The media processing module of the VoIP PBX 1085 replaces a port (9000) of the Internet phone A 1090 by a port (1030) and relays a media stream of the Internet phone A 1090 to the Internet phone B 1095 in step 1045. Here, it is assumed that the Internet phone B 1095 has not received a media stream of the Internet phone A 1090.

The Internet phone B 1095 transmits a media stream to the media processing module of the VoIP PBX 1085 in step 1050. That is, the Internet phone B 1095 transmits a packet whose destination address is 165.213.89.100 and whose destination port is 40002 via a port (1026).

The media processing module of the VoIP PBX 1085 relays a media stream of the Internet phone B 1095 to the Internet phone A 1090 whose destination address is 165.213.89.151 and whose port is 1030 using the changed media management table of eMPS (refer to Table 4) in step 1055.

The media processing module of the VoIP PBX 1085 receives a media stream whose source address and port are 165.213.89.151, 1030 and whose destination address and port are 165.213.89.100, 40000 from the Internet phone A 1090 in step 1060.

The media processing module of the VoIP PBX 1085 relays a media stream of the Internet phone A 1090 to the Internet phone B 1095 whose destination address is 165.213.89.150 and whose port is 1026 in step 1065.

The Internet phone A 1090 transmits a disconnect message to the signaling processing module of the VoIP PBX 1080 in order to disconnect a call in step 1070. The signaling processing module of the VoIP PBX 1080 transmits a disconnect message to the Internet phone B 1095 in step 1075.

TABLE 4

| Index | Inbound Source IP Address | Inbound Source UDP Port | Inbound Destination IP Address | Inbound Destination UDP Port | Outbound Source IP Address | Outbound Source UDP Port | Outbound Destination IP Address | Outbound Destination UDP Port | QoS | Etc Traffic Statistics |
|---|---|---|---|---|---|---|---|---|---|---|
| 1 | 165.213.89.151 | 9000 | 165.213.89.100 | 40000 | 165.213.89.150 | 9000 | 165.213.89.100 | 40002 | 000100 | 1000/1000 |

After a call connection procedure is completed, the Internet phone B 1095 transmits a media stream to the media processing module of the VoIP PBX 1085 in step 1030. That is, the Internet phone B 1095 transmits a packet whose destination address is 165.213.89.100 and whose destination port is 40002 via a port (1026) because an address/port of the Internet phone B 1095 has been mapped from 165.213.89.150, 1026 to an address/port (165.213.89.100, 40002) of eMPS.

The media processing module of the VoIP PBX 1085 replaces a port (9000) of the Internet phone B 1095 by a port (1026), and relays a media stream of the Internet phone B 1095 to the Internet phone A 1090 using the media management table of eMPS (refer to Table 4) in step 1035. A source address of the relay packet uses a port of eMPS assigned to the Internet phone A 1090 as a source port (40000), and a destination address/port is changed to an address/port (165.213.89.151: 9000) of the Internet phone A 1090. How- As described above, when both calling/called Internet phones are located in a private network, they are located in an NAT environment, so that media transmission fails and a packet is redirected based on UDP information of a media packet sent by an Internet phone and so a media service can be performed successfully.

Figure 11:
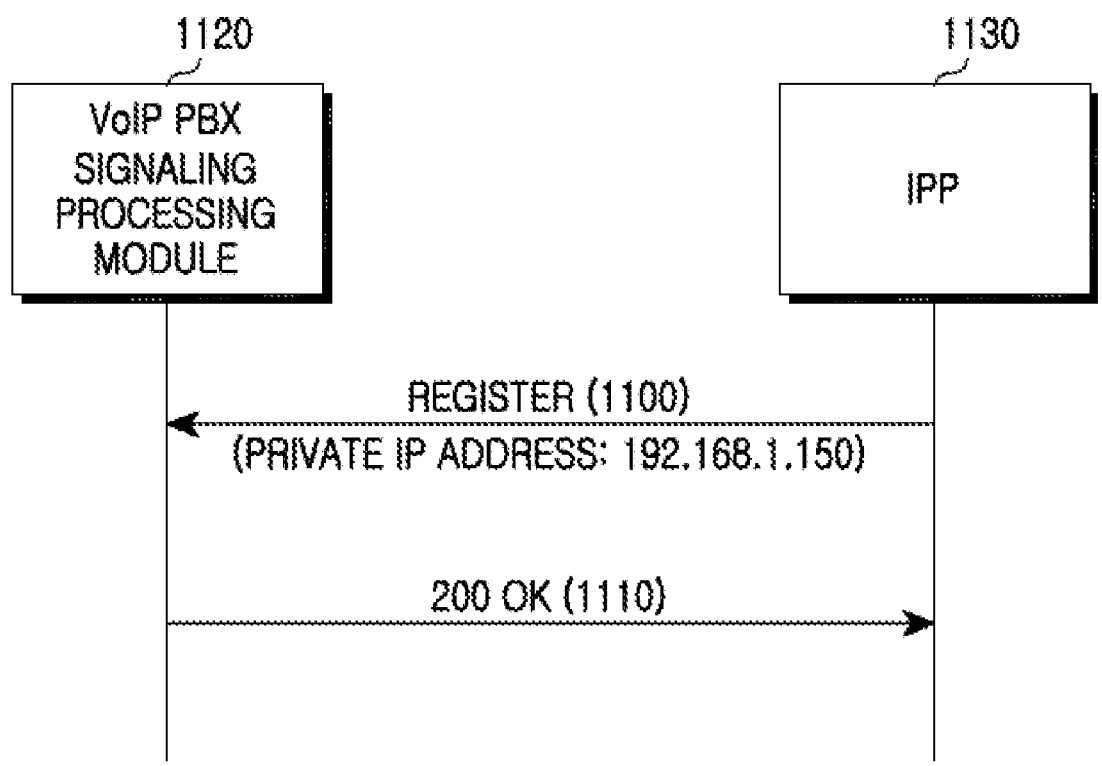
FIG. 11 is an exemplary view illustrating eMPS registration using Session Initiation Protocol (SIP) according to an exemplary embodiment of the present invention.

FIG. 11 is an exemplary diagram illustrating eMPS registration using Session Initiation Protocol (SIP) according to an exemplary embodiment of the present invention.

Referring to FIG. 11, a signaling processing module of the VoIP PBX 1120 receives an SIP Register message from an Internet phone 1130 and determines an address of the Internet phone 1130 using a Uniform Resource Locator (URL) of the SIP Register message and updates the address of the Internet phone 1130 in step 1100. The signaling processing module of the VoIP PBX 1120 transmits a registration confirm message via a 200 OK message in step 1110.

Figure 12:
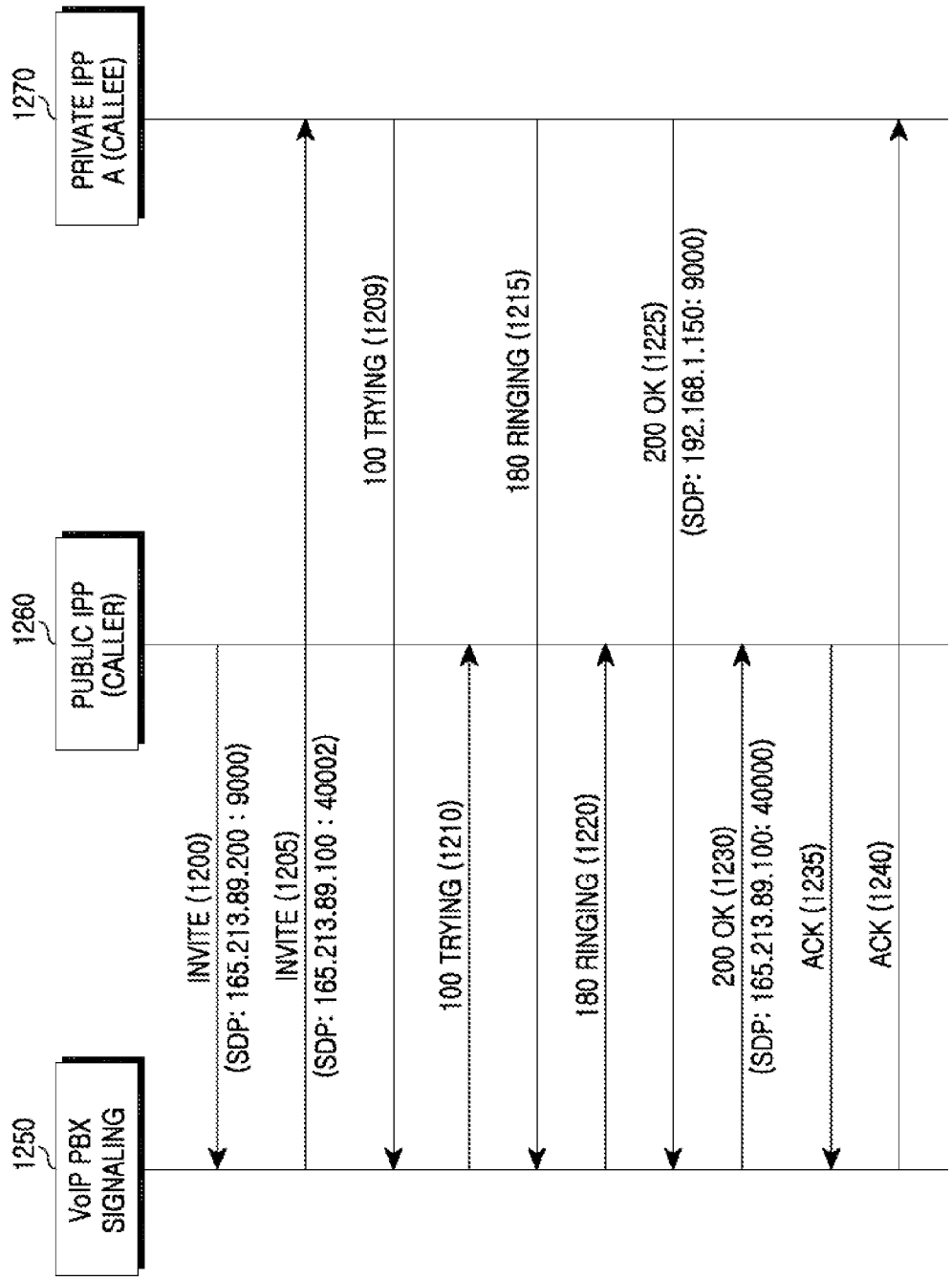
FIG. 12 is a diagram illustrating an SIP signaling procedure for supporting eMPS of an Internet phone A of a public network and an Internet phone B of a private network according to an exemplary embodiment of the present invention.

FIG. 12 is a diagram illustrating an SIP signaling procedure for supporting eMPS of an Internet phone A of a public network and an Internet phone B of a private network according to an exemplary embodiment of the present invention.

Referring to FIG. 12, an Internet phone 1260 transmits an INVITE message to the signaling processing module of the VoIP PBX 1250 in step 1200. The signaling processing module of the VoIP PBX 1250 transmits an INVITE message including an eMPS address (165.213.89.100:40002) mapped with the Internet phone 1260 to the Internet phone A 1270 in step 1205.

That is, a Session Description Protocol (SDP) of each message includes an address/port, and eMPS address/port of an Internet phone, so that media session can be connected.

The Internet phone A 1270 transmits a 100 Trying message to the signaling processing module 1250 in step 1209. The signaling processing module 1250 transmits a 100 Trying message to the Internet phone 1260 in step 1210.

The Internet phone A 1270 transmits a 180 Ringing message to the signaling processing module 1250 in step 1215. The signaling processing module 1250 transmits a 180 Ringing message to the Internet phone 1260 in step 1220.

The Internet phone A 1270 transmits a 200 OK message to the signaling processing module 1250 in step 1225. The signaling processing module 1250 transmits a 200 OK message to the Internet phone 1260 in step 1230. That is, since the Internet phone A 1270 cannot recognize public IP address/port information, the Internet phone A 1270 transmits a 200 OK message including private IP address and port information.

The Internet phone 1260 transmits an ACK message to the signaling processing module of the VoIP PBX 1250 in step 1235. The signaling processing module of the VoIP PBX 1250 transmits an ACK message to the Internet phone A 1270 in step 1240.

Figure 13:
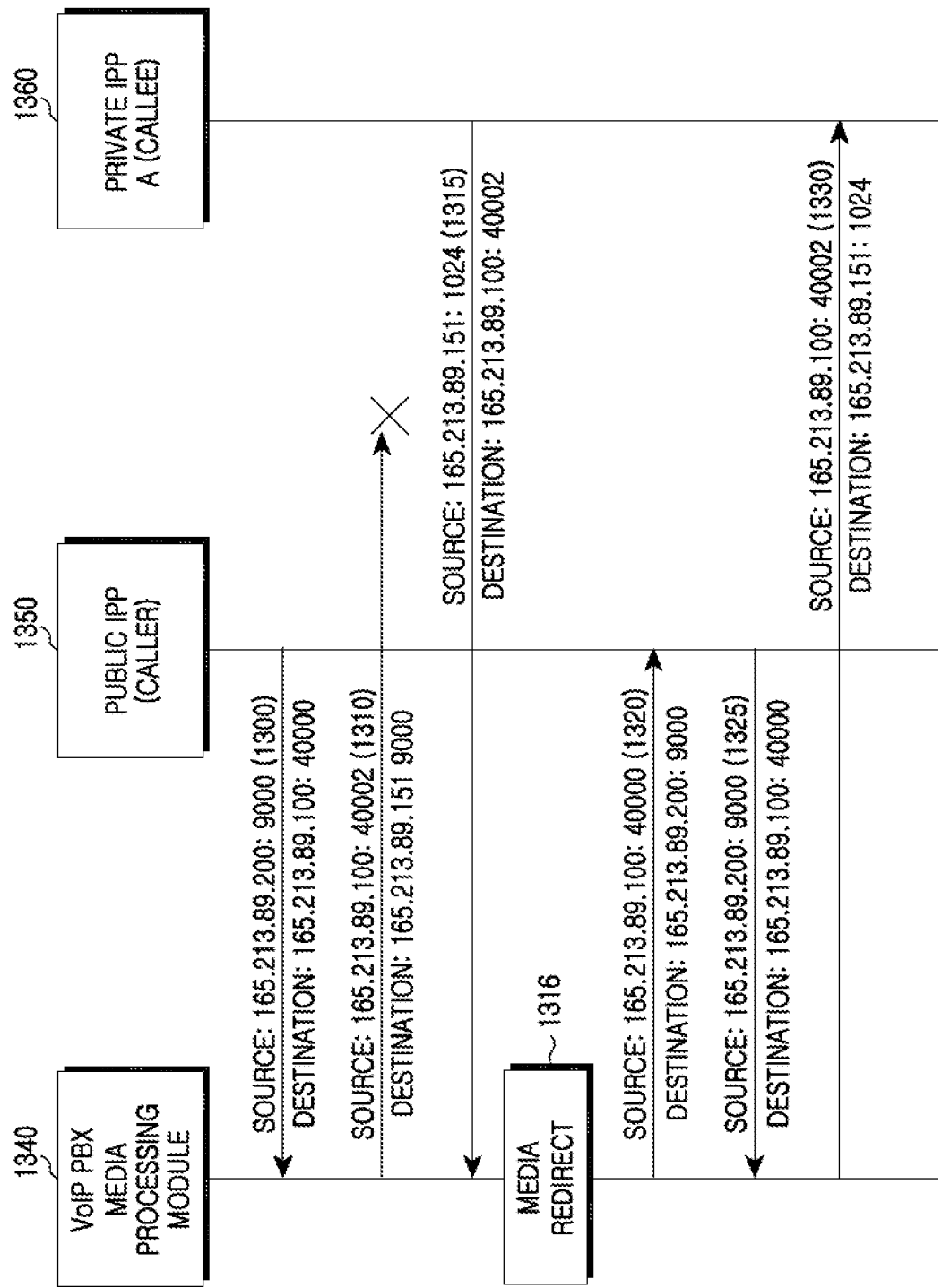
FIG. 13 is a diagram illustrating an SIP signaling procedure for processing media data between an Internet phone A of a public network and an Internet phone B of a private network according to an exemplary embodiment of the present invention.

FIG. 13 is a diagram illustrating a media data processing procedure via SIP signaling between an Internet phone 1350 of a public network and an Internet phone A 1360 of a private network according to an exemplary embodiment of the present invention.

Referring to FIG. 13, the Internet phone 1350 transmits media data whose destination address is 165.213.89.100 and whose port is 40000 to the media processing module of the VoIP PBX 1340 in step 1300.

The media processing module of the VoIP PBX 1340 relays media data received from the Internet phone 1350 to the Internet phone A 1360 whose destination address is 165.213.89.151 and whose port is 9000 in step 1310. However, when the Internet phone A 1360 located in a private network uses a port (1024), the Internet phone A 1360 cannot receive relay media data from the media processing module of the VoIP PBX 1340.

The media processing module of the VoIP PBX 1340 receives media data from the Internet phone A 1360 in step 1315, and compares previous source address and port information with address and port information of currently received media data to update the address and port information step 1316. For example, a previous port (9000) is replaced by a current port (1024).

The media processing module of the VoIP PBX 1340 relays media data received from the Internet phone A 1360 using the updated address and port information in step 1320.

The media processing module of the VoIP PBX 1340 receives media data from the Internet phone 1350 in step 1325, and relays media data received from the Internet phone 1350 to the Internet phone A 1360 using the updated address and port information in step 1330.

Figure 14:
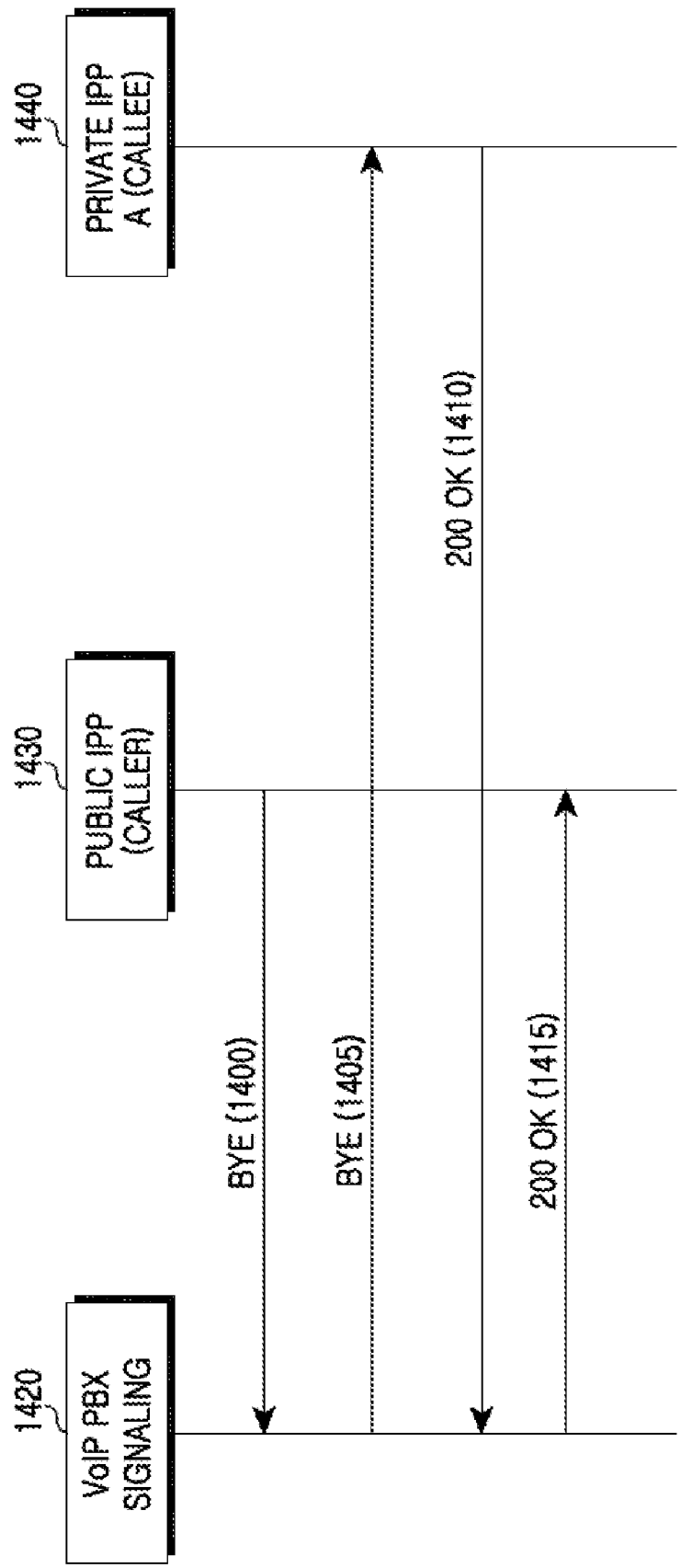
FIG. 14 is a diagram illustrating a call terminating procedure between an Internet phone A of a public network and an Internet phone B of a private network according to an exemplary embodiment of the present invention.

FIG. 14 is a diagram illustrating a call terminating procedure between an Internet phone 1430 of a public network and an Internet phone A 1440 of a private network according to an exemplary embodiment of the present invention.

Referring to FIG. 14, the Internet phone 1430 transmits a BYE message to the signaling processing module of the VoIP PBX 1420 in step 1400. The signaling processing module of the VoIP PBX 1420 transmits a BYE message to the Internet phone A 1440 in step 1405.

The Internet phone A 1440 transmits a 200 OK message to the signaling processing module of the VoIP PBX 1420 in step 1410. The signaling processing module of the VoIP PBX 1420 transmits a 200 OK message to the Internet phone 1430 in step 1415.

Figure 15:
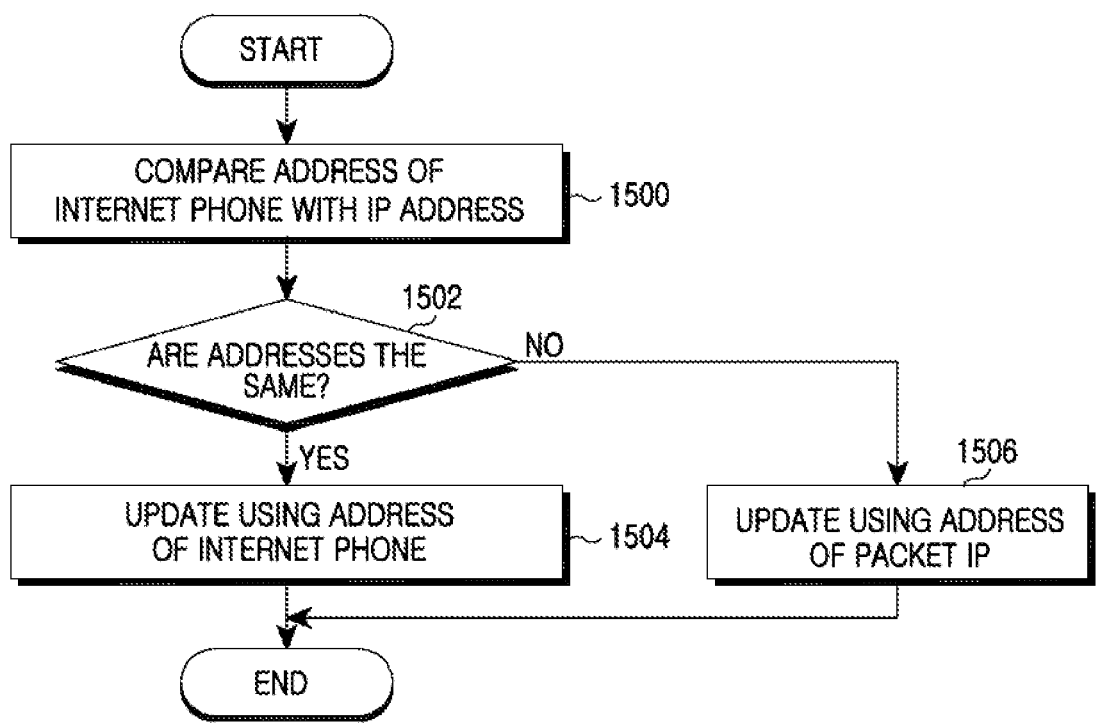
FIG. 15 is a flowchart for detecting a public IP address of an Internet phone using a registration message in a VoIP PBX system according to an exemplary embodiment of the present invention.

FIG. 15 is a flowchart for detecting a public IP address of an Internet phone using a registration message in a VoIP PBX system according to an exemplary embodiment of the present invention.

Generally, an Internet phone uses a VoIP service through a registration process. In this registration process, the Internet phone updates a registration state of the Internet phone by periodically transmitting a registration message. In addition, the VoIP PBX determines a connection state of the Internet phone via the registration message.

Referring to FIG. 15, a VoIP PBX compares an address of an Internet phone included in a registration message with an IP address of a packet when receiving a registration message in step 1500.

If it is determined that the two addresses are the same in step 1502, the VoIP PBX determines the Internet phone is located in a public network and performs an update using an address of the Internet phone in step 1504. On the other hand, if it is determined in step 1502 that the two addresses are not the same, the VoIP PBX determines the Internet phone is located in a private network and performs an update using a packet IP address in step 1506.

After that, the procedure ends.

Figure 16:
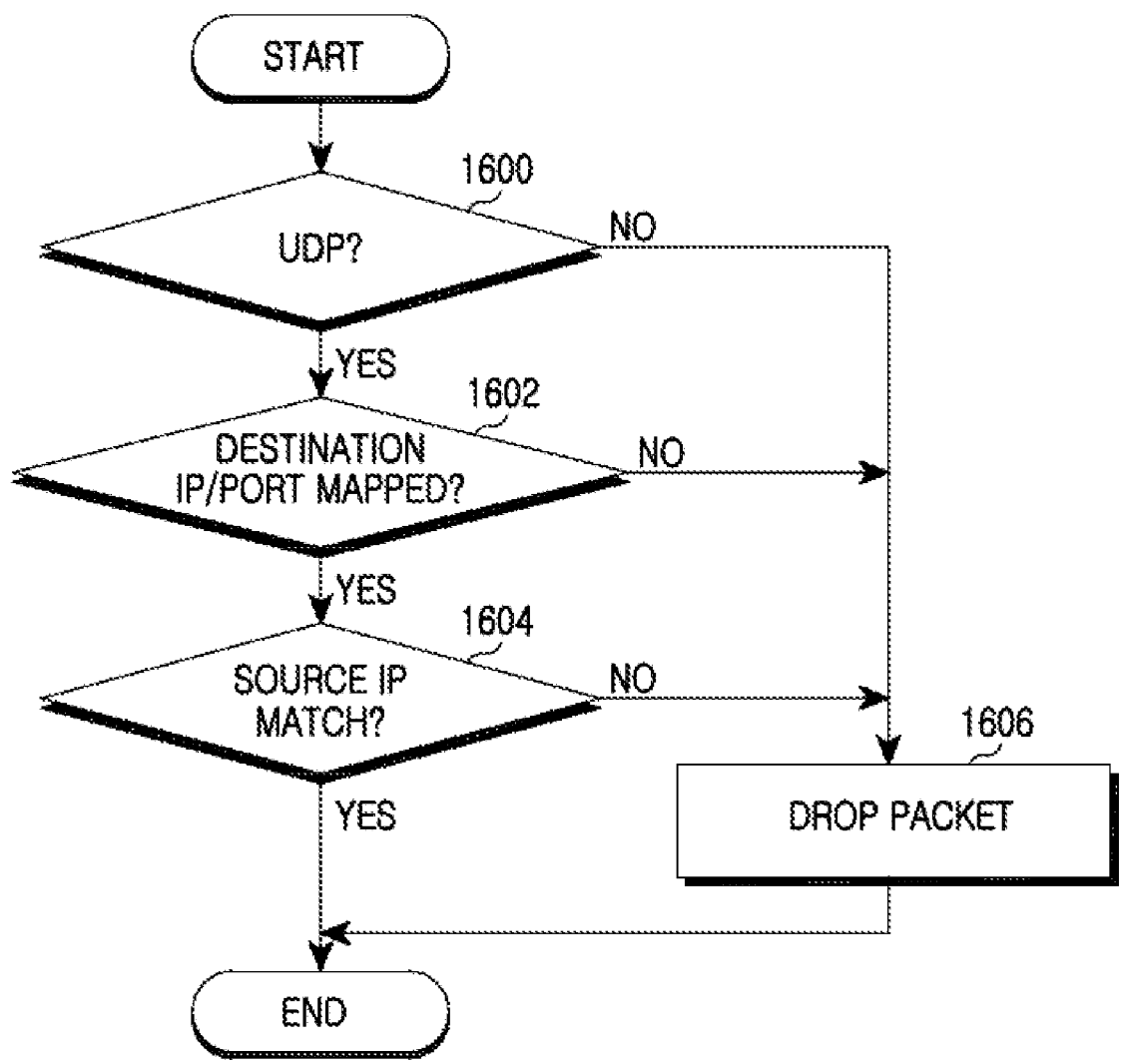
FIG. 16 is a flowchart for admission control through filtering of a packet received via a registered destination address, port, and source address in a VoIP PBX system according to an exemplary embodiment of the present invention.

FIG. 16 is a flowchart for admission control through filtering of a packet received via a registered destination address, port, and source address in a VoIP PBX system according to an exemplary embodiment of the present invention.

Referring to FIG. 16, a VoIP PBX determines whether a received media packet is a UDP in step 1600. If the VoIP PBX determines that the received media packet is a UDP in step 1600, the VoIP PBX determines whether an IP address and a port of a destination match using an eMPS management table in step 1602. If the VoIP PBX determines that the IP address and the port of the destination match in step 1602, the VoIP PBX determines whether a source IP address matches using the eMPS management table in step 1604.

On the other hand, when it is determined that the received media packet is not the UDP in step 1600, the IP address and the port of the destination do not match using the eMPS management table in step 1602, or the source IP address does not match using the eMPS management table in step 1604, a relevant packet is dropped in step 1606.

After that, the procedure ends.

Figure 17:
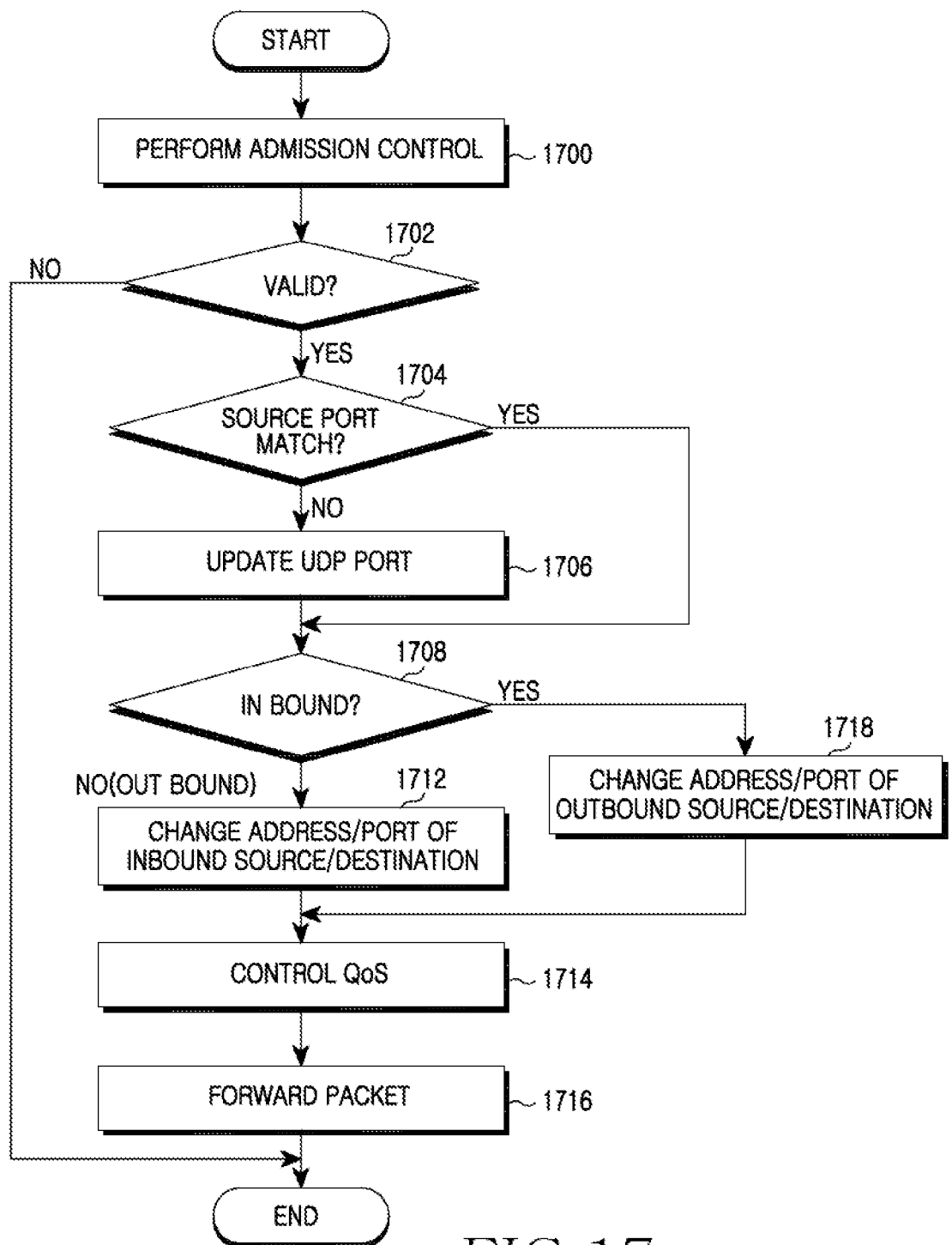
FIG. 17 is a flowchart for processing Network Address Translation (NAT) traversal by port redirection of a received media stream in a VoIP PBX system according to an exemplary embodiment of the present invention.

FIG. 17 is a flowchart for processing NAT traversal by port redirection of a received media stream in a VoIP PBX system according to an exemplary embodiment of the present invention.

Referring to FIG. 17, a VoIP PBX performs an admission control on a received media packet in step 1700.

The VoIP PBX determines whether a received packet is valid in step 1702, and, if it is determined in step 1702 that the received packet is valid, determines whether a source port of a received media packet matches with information registered in a media management table in step 1704.

If it is determined in step 1704 that the source port of the received media packet does not match with the information registered in the media management table, the VoIP PBX recognizes that an Internet phone exists in an NAT environment and updates port information registered in the Internet phone in step 1706.

In step 1708, the VoIP PBX determines if the received media packet is outbound traffic. If it is determined in step 1708 that the received media packet is outbound traffic, the VoIP PBX changes an address/port of an inbound source/destination in order to relay the received media packet to a counterpart Internet phone in step 1712.

In contrast, if it is determined in step 1708 that the received media packet is inbound traffic, the VoIP PBX changes an address/port of an outbound source/destination in order to relay the received media packet to a counterpart Internet phone in step 1718.

When QoS information for a media stream exists, the VoIP PBX adds Type of Service (ToS) or Differentiated Service Code Point (DSCP) information in step 1714.

In step 1716, the VoIP PBX transmits a packet according to an IP forwarding technique.

After that, the procedure ends.

Figure 18:
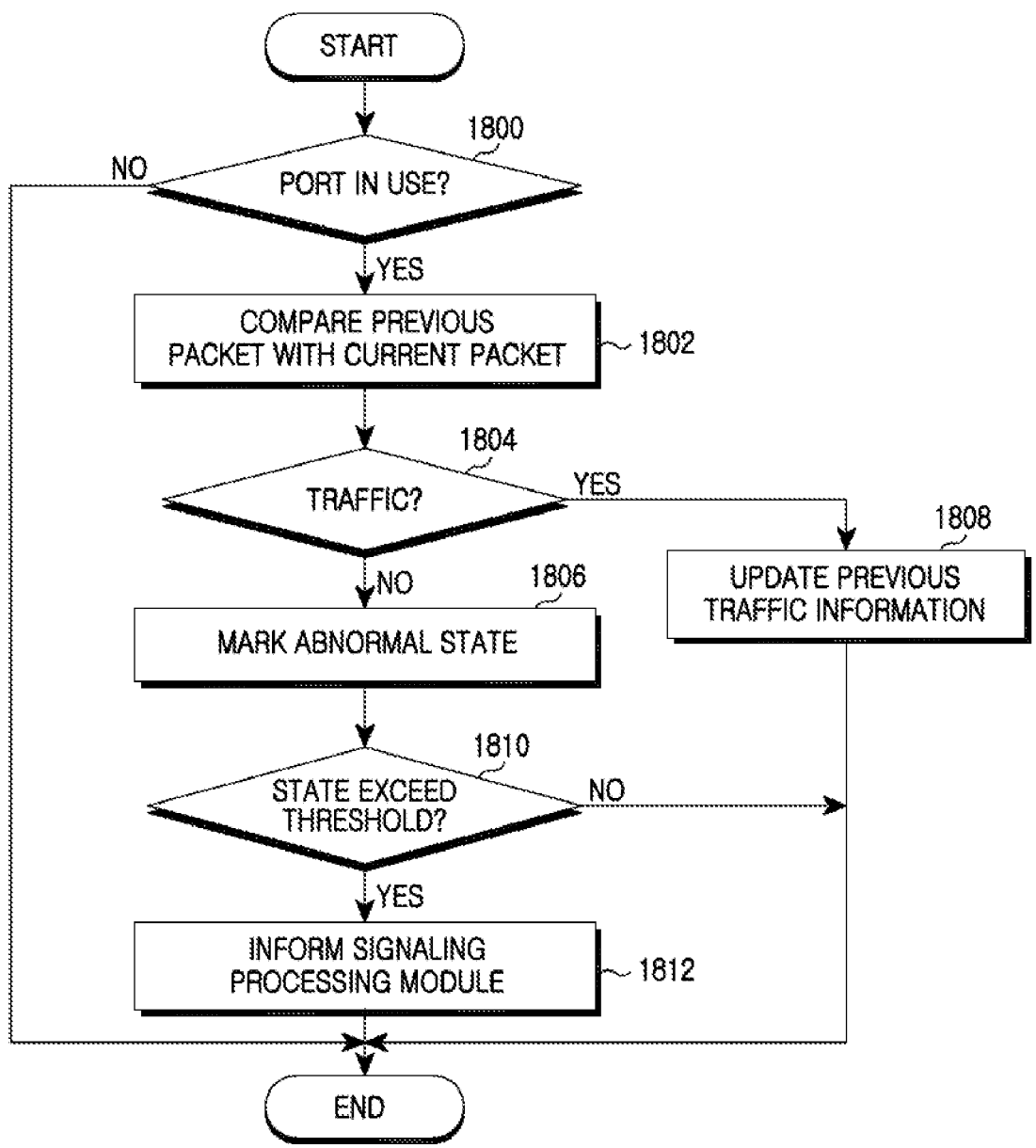
FIG. 18 is a flowchart for controlling a call through transmission state information of a media management table in a VoIP PBX system according to an exemplary embodiment of the present invention.

FIG. 18 is a flowchart for controlling a call through transmission state information of a media management table in a VoIP PBX system according to an exemplary embodiment of the present invention.

Referring to FIG. 18, a VoIP PBX determines whether a relevant port is in use in step 1800. If it is determined that the relevant port is in use, the VoIP PBX compares previous traffic information with current traffic information in step 1802.

In step 1804, the VoIP PBX determines if traffic change exists. If it is determined in step 1804 that traffic change exists, the VoIP PBX updates the previous traffic information in step 1808.

In contrast, if it is determined in step 1804 that traffic change does not exist, the VoIP PBX marks an abnormal state in step 1806, and determines whether the state exceeds a threshold in step 1810.

If it is determined in step 1810 that the state exceeds the threshold, the VoIP PBX informs the signaling processing module that the state exceeds the threshold through an indication message in step 1812.

After that, the procedure ends.

As described above, a media transmission state is periodically monitored and when the media transmission state does not change and exceeds the threshold, the signaling processing module is informed of this state through an indication message, so that a call can be controlled.

As described above, NAT traversal solution can be provided by introducing eMPS to a small and medium-sized IP-PBX. In addition, not only an efficient VoIP service can be provided regardless of a location of an Internet phone at low costs, but also QoS and traffic control function can be provided.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating an exchange for supporting Network Address Translation (NAT) traversal in a Voice over Internet Protocol (VoIP) system, the method comprising:

receiving a registration message from at least one Internet phone, determining whether the corresponding at least one Internet phone is located in a public network or a private network based on a comparison of an IP address of a packet included in the registration message with an IP address of the corresponding at least one Internet phone, and registering the IP address of the corresponding at least one Internet phone in association with the corresponding Internet phone if the corresponding Internet phone is determined to be located in the public network and registering the IP address of a packet included in the registration message with an IP address of the corresponding at least one Internet phone if the corresponding Internet phone is determined to be located in the private network;

performing first mapping of an IP address and a User Datagram Protocol (UDP) port of a calling Internet phone to a first embedded Media Proxy Solution (eMPS) IP address and UDP port, when receiving a setup request signal from the calling Internet phone;

relaying a setup request of the calling Internet phone comprising the first eMPS IP address and UDP port information to a called Internet phone;

receiving a response signal comprising an IP address and an UDP port of the called Internet phone, from the called Internet phone in response to the setup request;

performing second mapping of the IP address and UDP port of the called Internet phone to a second eMPS IP address and UDP port;

relaying a response signal comprising the second eMPS IP address and UDP port information to the calling Internet phone in response to the setup request and receiving media data from at least one of the calling Internet phone and the called Internet phone, and upon reception of the media data, comparing the UDP port from which the media data is communicated with the mapped UDP port stored in association with the corresponding at least one of the calling Internet phone and the called Internet phone, and updating the mapped UDP port with the UDP port from which the media data is communicated if the UDP port being used differs from the mapped UDP port, wherein the UDP port of a calling Internet phone is equal to the UDP port of the called Internet phone, and the first eMPS UDP port and the second eMPS UDP port is not equal to the UDP port of a calling Internet phone or the called Internet phone, the first eMPS UDP port is not equal to the second eMPS UDP port, and wherein the calling Internet phone and the called Internet phone each correspond to one of the at least one registered Internet phones.

2. The method of claim 1, further comprising generating a mapping table for NAT traversal between the calling Internet phone and the called Internet phone based on information of the first mapping and information of the second mapping.

3. The method of claim 2, wherein the mapping table comprises at least one of Quality of Service (QoS) and traffic state information between the calling Internet phone and the called Internet phone.

4. The method of claim 1, wherein the IP address of the called Internet phone received in the response signal comprises a private IP address of the called Internet phone.

5. A method for operating an exchange for supporting Network Address Translation (NAT) traversal in a Voice over Internet Protocol (VoIP) system, the method comprising:
receiving a registration message from at least one Internet phone, determining whether the corresponding at least one Internet phone is located in a public network or a private network based on a comparison of an IP address of a packet included in the registration message with an IP address of the corresponding at least one Internet phone, and registering the IP address of the corresponding at least one Internet phone in association with the corresponding Internet phone if the corresponding Internet phone is determined to be located in the public network and registering the IP address of a packet included in the registration message with an IP address of the corresponding at least one Internet phone if the corresponding Internet phone is determined to be located in the private network;
receiving media data from a calling Internet phone based on a first source address and a first User Datagram Protocol (UDP) port information, and a first destination address and a second UDP port information;
determining a second destination address and a third UDP port corresponding to the first destination address and the second UDP port, and a second source address and a fourth UDP port corresponding to the first source address and the first UDP port using a mapping table;
comparing the UDP port from which the media data is communicated with the mapped UDP port stored in association with the corresponding at least one of the calling Internet phone and the called Internet phone, and updating the mapped UDP port with the UDP port from which the media data is communicated if the UDP port being used differs from the mapped UDP port; and
relaying the media data to a called Internet phone based on the second destination address and the third UDP port, and the second source address and the fourth UDP port,
wherein the UDP port of a calling Internet phone is equal to the UDP port of the called Internet phone, and the first eMPS UDP port and the second eMPS UDP port is not equal to the UDP port of a calling Internet phone or the called Internet phone, the first eMPS UDP port is not equal to the second eMPS UDP port, and
wherein the calling Internet phone and the called Internet phone each correspond to one of the at least one registered Internet phones.

6. The method of claim 5, further comprising:
receiving media data from the called Internet phone to switch to a public port of the called Internet phone, when the third UDP port and the public port of the called Internet phone are different from each other; and
relaying media data of the calling Internet phone to the called Internet phone via the public port of the called Internet phone.

7. A method for operating an exchange for supporting Network Address Translation (NAT) traversal in a Voice over Internet Protocol (VoIP) system, the method comprising:
receiving a registration message from at least one Internet phone, determining whether the corresponding at least one Internet phone is located in a public network or a private network based on a comparison of an IP address of a packet included in the registration message with an IP address of the corresponding at least one Internet phone, and registering the IP address of the corresponding at least one Internet phone in association with the corresponding Internet phone if the corresponding Internet phone is determined to be located in a public network and registering the IP address of a packet included in the registration message with an IP address of the corresponding at least one Internet phone if the corresponding Internet phone is determined to be located in the private network;
receiving a packet from an Internet phone;
comparing an IP address and a User Datagram Protocol (UDP) port of the received packet with registered information;
converting the IP address and the UDP port of the received packet into an IP address and an UDP port for the NAT traversal;
relaying the received packet to a counterpart Internet phone using the converted IP address and UDP port; and
receiving media data from at least one of the calling Internet phone and the called Internet phone, and upon reception of the media data, comparing the UDP port from which the media data is communicated with the mapped UDP port stored in association with the corresponding at least one of the calling Internet phone and the called Internet phone, and updating the mapped UDP port with the UDP port from which the media data is communicated if the UDP port being used differs from the mapped UDP port,
wherein the UDP port of a calling Internet phone is equal to the UDP port of the called Internet phone, and the first eMPS UDP port and the second eMPS UDP port is not equal to the UDP port of a calling Internet phone or the called Internet phone, the first eMPS UDP port is not equal to the second eMPS UDP port, and
wherein the calling Internet phone and the called Internet phone each correspond to one of the at least one registered Internet phones.

8. The method of claim 7, further comprising performing an admission control through packet filtering based on the IP address and the UDP port of the received packet.

9. The method of claim 7, further comprising setting Quality of Service (QoS) by adding one of Type of Service (ToS) and Differentiated Service Code Point (DSCP) with respect to the received packet.

10. The method of claim 7, further comprising performing a call control by monitoring a traffic state transferred via the UDP port of the packet.

11. The method of claim 7, further comprising, when the IP address and the UDP port of the received packet do not match with the registered information, updating one of a previous IP address and a previous UDP port.

12. A system for supporting Network Address Translation (NAT) traversal in a Voice over Internet Protocol (VoIP) system, the system comprising:
a calling Internet phone for transmitting a setup request signal to an exchange to receive IP address and User Datagram Protocol (UDP) port information for NAT traversal of a called Internet phone;
the called Internet phone for transmitting a response signal to the exchange in response to the setup request signal to receive IP address and UDP port information for NAT traversal of the calling Internet phone; and
the exchange for receiving a registration message from at least one Internet phone, for determining whether the corresponding at least one Internet phone is located in a public network or a private network based on a comparison of an IP address of a packet included in the registration message with an IP address of the corresponding at least one Internet phone, and for registering the IP address of the corresponding at least one Internet phone in association with the corresponding Internet phone if the corresponding Internet phone is determined to be located in a public network and registering the IP address of a packet included in the registration message with an IP address of the corresponding at least one Internet phone if the corresponding Internet phone is determined to be located in the private network, for generating an IP address and an UDP port for NAT traversal of the called Internet phone, for relaying the same to the calling Internet phone, for generating an IP address and an UDP port for NAT traversal of the calling Internet phone, for relaying the same to the called Internet phone, and for comparing the UDP port from which media data is communicated with the mapped UDP port stored in association with the corresponding at least one of the calling Internet phone and the called Internet phone, and for updating a mapped UDP port with the UDP port from which the media data is communicated if the UDP port being used differs from the mapped UDP port, wherein the UDP port of a calling Internet phone is equal to the UDP port of the called Internet phone, and the first eMPS UDP port and the second eMPS UDP port is not equal to the UDP port of a calling Internet phone or the called Internet phone, the first eMPS UDP port is not equal to the second eMPS UDP port, and wherein the calling Internet phone and the called Internet phone each correspond to one of the at least one registered Internet phones.

13. The system of claim 12, wherein the exchange performs first mapping that maps an IP address and a UDP port of the calling Internet phone to the IP address and the UDP port for the NAT traversal of the calling Internet phone, and performs second mapping that maps an IP address and an UDP port of the called Internet phone to the IP address and the UDP port for the NAT traversal of the called Internet phone.

14. The system of claim 12, wherein the exchange generates a mapping table for NAT traversal between the calling Internet phone and the called Internet phone based on first mapping information and second mapping information.

15. The system of claim 14, wherein the mapping table comprises at least one of Quality of Service (QoS) and traffic state information between the calling Internet phone and the called Internet phone.

16. The system of claim 12, wherein the response signal transmitted by the called Internet phone comprises a private IP address of the called Internet phone.

17. The system of claim 12, wherein if the exchange determines that the corresponding Internet phone is determined to be located in a public network, then the exchange registers the IP address of the packet included in the registration message in association with the corresponding Internet phone.

18. The method of claim 1, further comprising registering the IP address of the packet included in the registration message in association with the corresponding Internet phone if the Internet phone is determined to be located in a public network.

19. The method of claim 5, further comprising registering the IP address of the packet included in the registration message in association with the corresponding Internet phone if the Internet phone is determined to be located in a public network.

20. The method of claim 7, further comprising registering the IP address of the packet included in the registration message in association with the corresponding Internet phone if the Internet phone is determined to be located in a public network.

* * * * *